(12) United States Patent
Knigge et al.

(10) Patent No.: US 7,489,466 B2
(45) Date of Patent: Feb. 10, 2009

(54) ENABLING INTERMITTENT CONTACT RECORDING ON-DEMAND

(75) Inventors: Bernhard E. Knigge, San Jose, CA (US); Steven N. Guilliams, San Francisco, CA (US); Andreas Moser, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 19 days.

(21) Appl. No.: 11/646,794

(22) Filed: Dec. 27, 2006

(65) Prior Publication Data
US 2008/0158704 A1 Jul. 3, 2008

(51) Int. Cl.
*G11B 21/02* (2006.01)
(52) U.S. Cl. ............................................. 360/75; 36/31
(58) Field of Classification Search ........................ None
See application file for complete search history.

(56) References Cited

U.S. PATENT DOCUMENTS

| | | | |
|---|---|---|---|
| 4,669,011 A | 5/1987 | Lemke | |
| 4,853,810 A | 8/1989 | Pohl et al. | |
| 5,764,432 A | 6/1998 | Kasahara | |
| 5,808,825 A | 9/1998 | Okamura | |
| 5,991,113 A | 11/1999 | Meyer et al. | |
| 6,293,135 B1 | 9/2001 | Marchon et al. | |
| 6,314,814 B1 | 11/2001 | Brannon et al. | |
| 6,700,724 B2* | 3/2004 | Riddering et al. | 360/69 |
| 6,757,124 B2* | 6/2004 | Kelemen | 360/75 |
| 6,757,125 B2 | 6/2004 | Vettiger et al. | |
| 2002/0093753 A1* | 7/2002 | Atsumi | 360/73.03 |
| 2005/0007687 A1 | 1/2005 | Feng et al. | |
| 2005/0024775 A1* | 2/2005 | Kurita et al. | 360/234.3 |
| 2005/0073768 A1 | 4/2005 | Pit et al. | |
| 2005/0174665 A1 | 8/2005 | Zhang et al. | |
| 2005/0270684 A1* | 12/2005 | Baumgart et al. | 360/75 |
| 2006/0002001 A1* | 1/2006 | Fong et al. | 360/75 |
| 2007/0230002 A1* | 10/2007 | Kassab | 360/31 |
| 2007/0236821 A1* | 10/2007 | Ma et al. | 360/75 |

FOREIGN PATENT DOCUMENTS

EP 242597 10/1987

(Continued)

OTHER PUBLICATIONS

Juang, Jia-Yang, et al., "Controlled-Flying Proximity Sliders for Head-Media Spacing Variation Suppression in Ultralow Flying Air Bearings", *IEEE Transactions on Magnetics*, vol. 41, No. 10, (Oct. 2005),3052-3054.

(Continued)

*Primary Examiner*—Jason C Olson

(57) ABSTRACT

One embodiment in accordance with the invention is a method that comprises determining if a slider of a data storage device is to perform a read or write operation with a disk of the data storage device. If the slider is to perform the read or write operation, the slider is set at a grazing contact with the disk for a predefined time frame to perform the read or write operation. The predefined time frame is approximately how long the slider can be in grazing contact with the disk without experiencing any substantial instability. After the predefined time frame expires, the slider is caused to move out of contact with the disk.

20 Claims, 20 Drawing Sheets

FOREIGN PATENT DOCUMENTS

| JP | 4157685 | 5/1992 |
| JP | 7235157 | 9/1995 |
| JP | 2003308670 | 10/2003 |

OTHER PUBLICATIONS

Knigge, Bernhard, "Contact Dynamics and Hysteresis by Pulsed Thermal Protrusion", *World Tribology Congress*, Washington DC, (Sep. 13, 2005),1-18.

Knigge, Bernhard, et al., "Write Protrusion Modulation for Sub-Nanometer Contact Interference", *Proceedings of WTC 2005, World Tribology Congress III*, Washington, D.C., (Sep. 12, 2005),1-2.

Tanaka, Hideaki, et al., "Slider Dynamics During Continuous Contact with Textured and Smooth Disks in Ultra Low Flying Height", *IEEE Transactions on Magnetics*, vol. 37, No. 2, (Mar. 2001),906-911.

Yeack-Scranton, C. E., et al., "An Active Slider for Practical Contact Recording", *IEEE Transactions on Magnetics* vol. 26, No. 5, (Sep. 1990),2478-2482.

* cited by examiner

ENABLING INTERMITTENT CONTACT RECORDING ON-DEMAND

BACKGROUND

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm is utilized to reach out over the disk. The arm carries a head assembly that has a magnetic read/write transducer or head for reading/writing information to or from a location on the disk. The transducer is attached to a slider, such as an air-bearing slider, which is supported adjacent to the data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

Another advancement to the hard disk drive is the use of smaller components. For example, by reducing the read/write tolerances of the head portion, the tracks on the disk can be reduced in size by the same margin. Thus, as modern micro recognition technology is applied to the head, the track size on the disk can be further compressed thereby enabling more tracks to be included on the disk, resulting in the disk having an increase data storage capacity.

Yet another advancement to the hard disk drive is the reduction of the "flying" height at which the magnetic read/write transducer head operates or flies above the disk. As the flying height has been continually reduced, a greater number of data can be stored on a disk surface. Given this advantage, some have reduced the flying height of the head to zero in order to implement contact recording to further increase the amount of data that can be stored by the disk. Ideally, in contact recording the magnetic read/write transducer head is in contact with the disk. However, there are disadvantages associated with this technique.

For example, contact recording or partial contact recording schemes suffer from high friction and wear of the read/write transducer head, which can be caused by the slider bouncing. Note that the amount of slide bounce is a function of the slider trailing pad area, roughness of the disk, and the properties of the lubricant on the disk. Note that it has been shown that higher disk roughness and smaller trailing pad area are able to reduce friction and bounce. However, that technique usually leads to large wear rates. Another technique to reduce slider friction wear and bounce has been to reduce the surface energy of the slider by coating it with polytetrafluoroethylene (PTFE) films, anti-wearing agents, or fluorinated carbon. The drawback of adding these films onto the slider is that they raise the slider fly height or magnetic spacing and that they wear off easily.

SUMMARY

One embodiment in accordance with the invention is a method that comprises determining if a slider of a data storage device is to perform a read or write operation with a disk of the data storage device. If the slider is to perform the read or write operation, the slider is set at a grazing contact with the disk for a predefined time frame to perform the read or write operation. The predefined time frame is approximately how long the slider can be in grazing contact with the disk without experiencing any substantial instability. After the predefined time frame expires, the slider is caused to move out of contact with the disk.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims.

Furthermore, in the following detailed description of various embodiments in accordance with the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Figure 1:
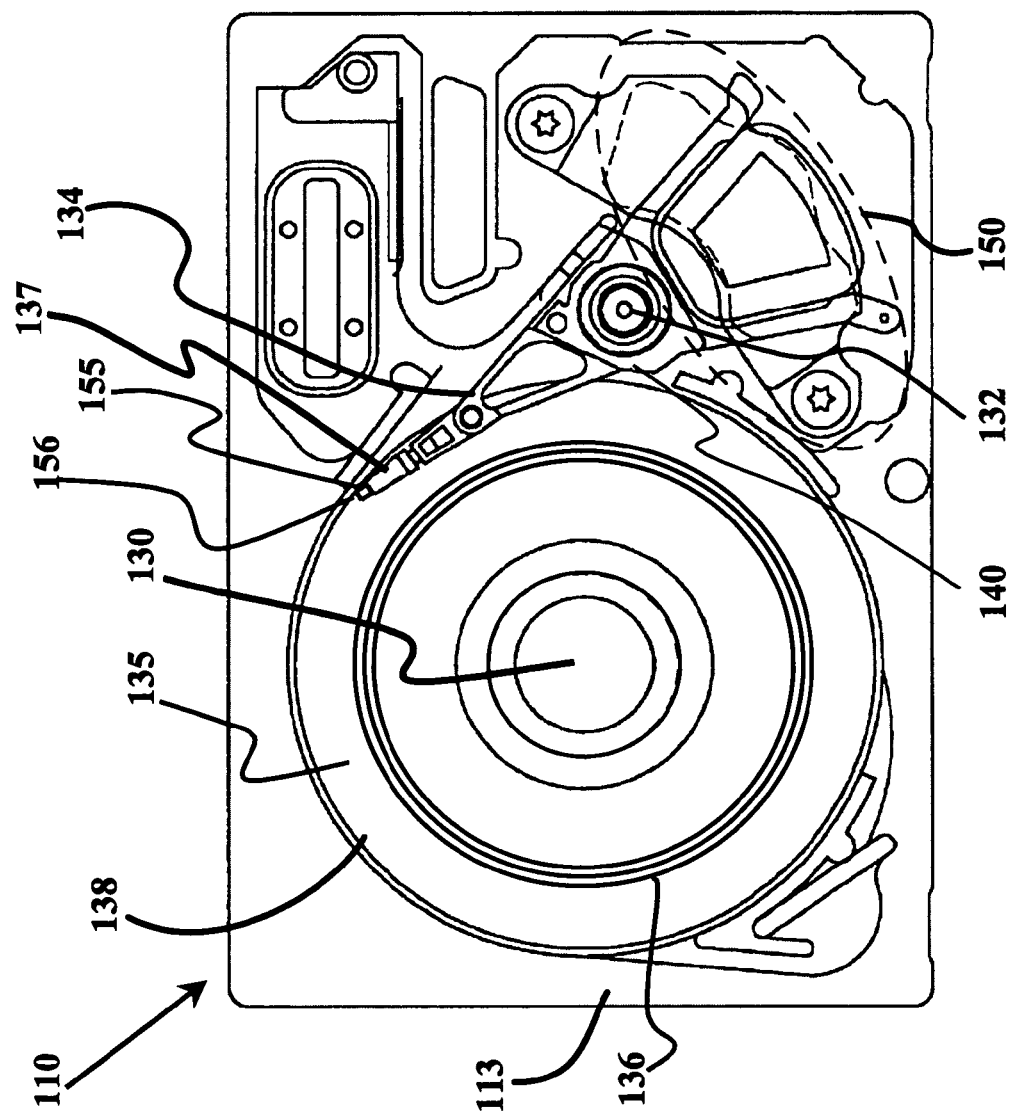
FIG. 1 is a plan view of a hard disk drive (HDD) with cover and top magnet removed in accordance with various embodiments of the invention.

With reference now to FIG. 1, which is a plan view of a hard disk drive (HDD) 110 with cover and top magnet removed in accordance with various embodiments of the invention. It is noted that the HDD 110 can be referred to as a data storage device. FIG. 1 illustrates the relationship of exemplary components and sub-assemblies of HDD 110 and a representation of data tracks 136 recorded on the disk surfaces 135 (one shown). Note that the cover is removed and not shown so that the inside of HDD 110 is visible. The components are assembled into base casting 113, which provides attachment and registration points for components and sub-assemblies.

A plurality of suspension assemblies 137 (one shown) are attached to the actuator arms 134 (one shown) in the form of a comb. A plurality of transducer heads or sliders 155 (one shown) are attached respectively to the suspension assemblies 137. Sliders 155 are located proximate to the disk surfaces 135 for reading and writing data with magnetic heads 156 (one shown). The rotary voice coil motor 150 rotates actuator arms 134 about the actuator shaft 132 in order to move the suspension assemblies 150 to the desired radial position on disks 138. The actuator shaft 132, hub 140, actuator arms 134, and voice coil motor 150 may be referred to collectively as a rotary actuator assembly.

Within FIG. 1, data is recorded onto disk surfaces 135 in a pattern of concentric rings known as data tracks 136. Disk surface 135 is spun at high speed by means of a motor-hub assembly 130. Data tracks 136 are recorded onto spinning disk surfaces 135 by means of magnetic heads 156, which typically reside at the end of sliders 155. FIG. 1 being a plan view shows only one head, slider, and disk surface combination. One skilled in the art understands that what is described for one head-disk combination applies to multiple head-disk combinations, such as disk stacks (not shown). However, for purposes of brevity and clarity, FIG. 1 only shows one head and one disk surface.

Herein, attention is given to calibrating in drive the actual clearance of each slider 155 over its corresponding disk surface 135. Furthermore, attention is given to enabling intermittent contact read/write operations on-demand between each slider 155 and its corresponding disk surface 135.

Figure 2:
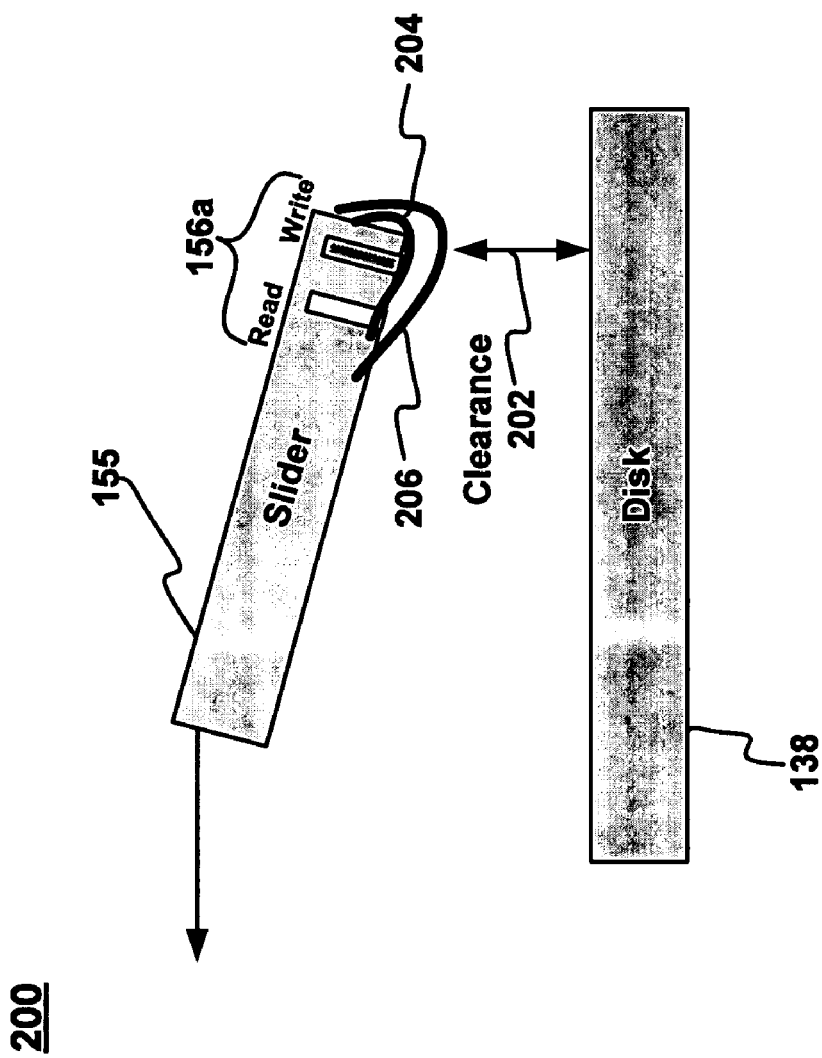
FIG. 2 is a side sectional view of an exemplary slider and a disk in accordance with various embodiments of the invention.

FIG. 2 is a side sectional view 200 of an exemplary slider (e.g., 155) and a disk (e.g., 138) in accordance with various embodiments of the invention. Specifically, the slider 155 is shown having a fly height or clearance 202 above the disk 138. The slider 155 can include a read/write magnetic head 156a. Note that the slider 155 can be implemented with active fly-height control capability or device (not shown), such as, a thermal heater, a piezoelectric actuator (e.g., PZT (Lead Zirconate Titanate) actuator), or voltage between the slider 155 and disk 138, but is not limited to such. In this manner, the clearance 202 between the slider 155 and the disk 138 can be reduced or increased on-demand. For example, the read/write head 156a can be implemented with a thermal heater, which is well known in the art. As such, when power is applied to the thermal heater, it causes the read/write head 156a to thermally expand as indicated by expansion lines 204 and 206 thereby reducing the clearance 202 between the slider 155 and the disk 138.

Conversely, when the power to the thermal heater is reduced, it causes the read/write head 156a to thermally contract as indicated by lines 206 and 204 thereby increasing the clearance 202 between the slider 155 and the disk 138. It is pointed out that the active fly-height control capability or device of slider 155 can be utilized in order to calibrate (or determine) the actual clearance 202 between the slider 155 and disk 138. Moreover, the active fly-height control capability of slider 155 can be utilized to implement on-demand intermittent contact read and/or write operations between the slider 155 and disk 138.

Within FIG. 2, in one embodiment, in order to calibrate each slider (e.g., 155) in the HDD 110, it can involve an absolute clearance measurement. It is pointed out that in order to do this, it can be beneficial to minimize contact time between the slider 155 and the disk 138. For example in one embodiment, this can be achieved by applying short pulses to a Thermal Fly-height Control (TFC) heater or write coil of the slider 155 to initiate contact between the slider 155 and the disk 138. Note that in one embodiment, each applied voltage pulse can be a square root of a triangular waveform so that the slider 155 goes linear (in power) into and out of contact with the disk 138. To better estimate the slider touchdown-takeoff hysteresis, any non-binary (or non-square wave) pulse can be utilized, but is not limited to such.

It is pointed out that on-demand intermittent contact read and/or write operations between the slider 155 and disk 138 enables higher areal densities for disk 138. In one embodiment, note that by using a TFC heater to control the active fly-height control capability of slider 155, the contact time and contact interference level between the slider 155 and disk 138 can be controlled very accurately. Furthermore, the contact area of slider 155 can be fairly small since only the protruded thermally expanded region of about 20 micrometers ($\mu$m)×20 $\mu$m would be in contact with disk 138 (note that the contact area can be dependent on the heater design and the slider air bearing design and it can be smaller than 10 $\mu$m×10 $\mu$m). As such, the small protruded area can translate into low friction and bounce when coming into contact with disk 138. By using a TFC heater, stable contact between the slider 155 and disk 138 can be achieved for certain controlled interference levels and for short contact times. For example in various embodiments, these stable contact times can range from several milliseconds to several minutes depending on the design of the head disk interface (HDI) 155. Longer contact times can be achieved and can be a function of the air bearing design of slider 155, type of lubricant on disk 138, roughness of disk 138, drive temperature, and other effects.

Additionally, a channel design in one embodiment can make sure that the TFC heater is not on for more than a given predefined time in order to insure slider 155 stability and drive integrity. Furthermore, the data channel can be designed and optimized to operate in "burst" modes. A memory buffer can be useful in this embodiment. The interference level can be controlled to less than 1 Angstrom. For example, by using the TFC heater to control slider 155 contact, the slider 155 can be controlled to stay within the lubricant layer when contacting the disk 138. Note that with the TFC heater, a contact force can be controlled. This is a significant advantage over static contact recording schemes where contact force is always fixed by the suspension/gimble pitch static attitude (PSA)/roll static attitude (RSA) and gramload.

It is understood that current and future fiber channels of HDD 110 can provide data rates of 2 to 4 terabits per second, or at 2 to 4 megabits per millisecond. As such, if contact can be maintained between the slider 155 and disk 138 for 4 milliseconds without inducing slider 155 vibrations or suspension 137 vibrations, that would translate to 16 megabits or 2 megabytes of data. This amount of data can be sufficient for applications such as MP3 players where a small amount of data is loaded into flash memory intermittently.

Figure 3:
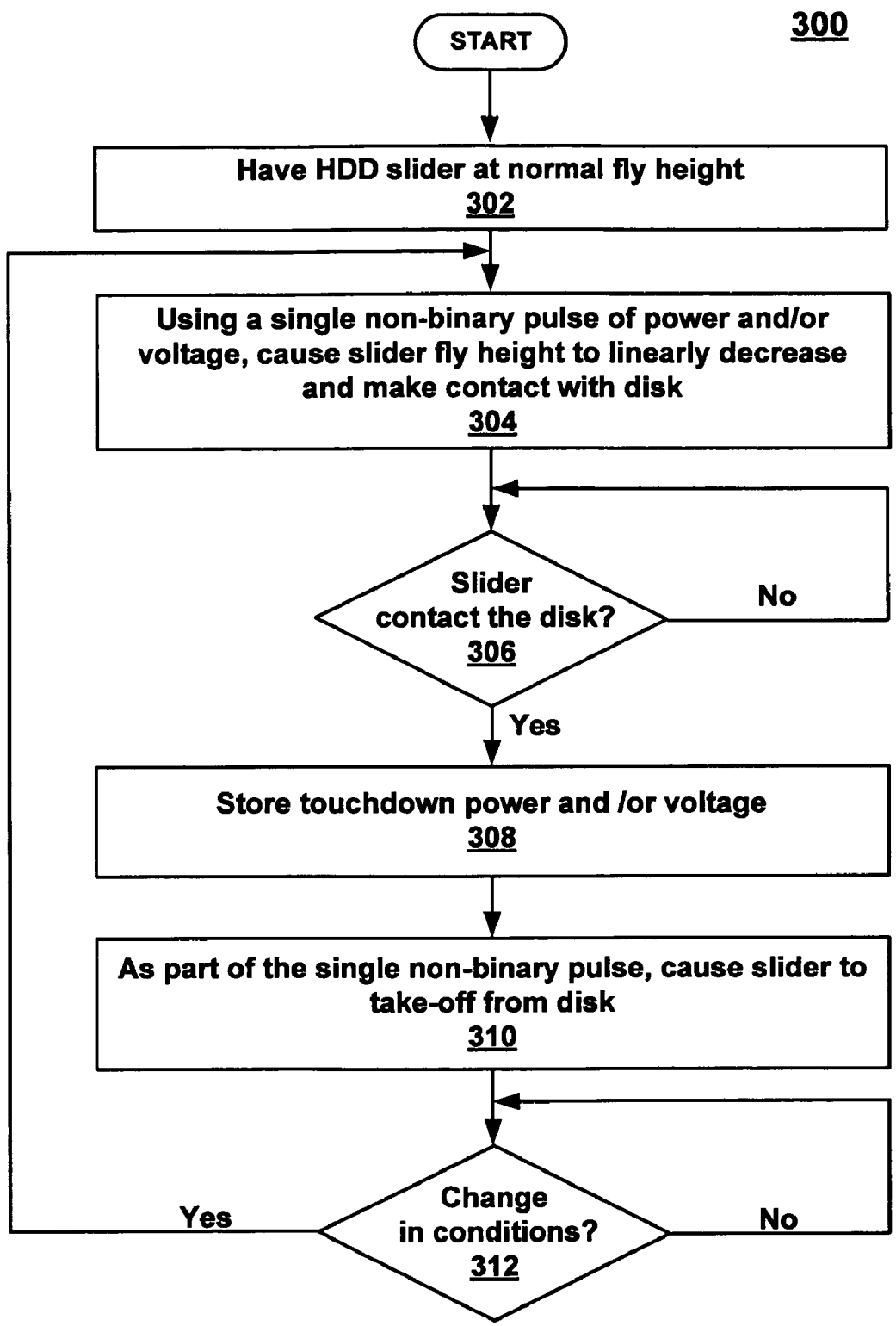
FIG. 3 is a flow diagram in accordance with various embodiments of the invention.

FIG. 3 is a flow diagram of an exemplary method 300 in accordance with various embodiments of the invention for calibrating a HDD slider clearance between the slider and a disk. Method 300 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 300, such operations are exemplary. Method 300 may not include all of the operations illustrated by FIG. 3. Also, method 300 may include various other operations and/or variations of the operations shown by FIG. 3. Likewise, the sequence of the operations of method 300 can be modified. It is noted that the operations of method 300 can be performed manually, by software, by firmware, by electronic hardware, or by any combination thereof.

Specifically, method 300 can include having a HDD slider located at its normal fly height. A single non-binary (or non-square wave) pulse of power and/or voltage can be input into an active fly-height control capability of the slider, which can causes the fly height of the slider to decrease and make it contact a disk. A determination can be made as to whether the slider is in contact with the disk. If not, the determination can be repeated. However, if it is determined that the slider is in contact with the disk, the value of the touchdown power and/or voltage input in the active fly-height control can be stored. It is noted that the touchdown power and/or voltage is the amount of power and/or voltage utilized with the active fly-height control that caused the slider to make contact with the disk. The slider is then caused to take-off from the disk as part of the single non-binary pulse of power and/or voltage being input into the active fly-height control. A determination can be made as to whether external conditions have changed for the HDD. If not, that determination can be repeated. However, if external conditions have changed, method 300 can proceed to repeat the causing of the slider to linearly descend in order to make contact with the disk. In this manner, a HDD slider clearance between the slider and a disk can be calibrated.

At operation 302 of FIG. 3, a HDD slider (e.g., 155) can be located at its normal fly height. It is appreciated that operation 302 can be implemented in a wide variety of ways. For example, the HDD slider can be located at its normal fly height in any manner similar to that described herein, but is not limited to such.

Figure 4:
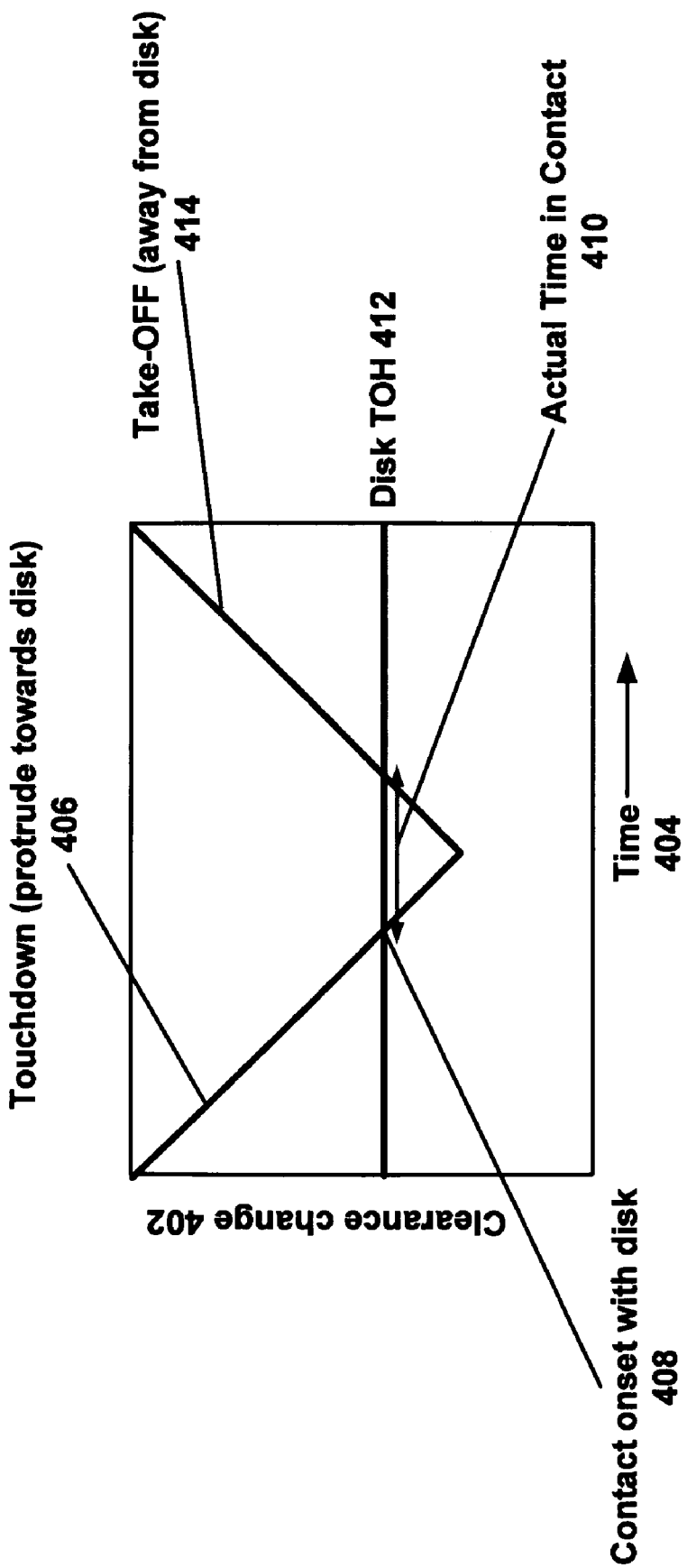
FIG. 4 is a graph that illustrates an exemplary calibration of the clearance between a HDD slider and a disk in accordance with various embodiments of the invention.

At operation 304, a single non-binary pulse of power and/or voltage can be input into an active fly-height control capability of the slider, which can cause the fly height (e.g., 202) of the slider to decrease and make it contact a disk (e.g., 138). It is understood that operation 304 can be implemented in a wide variety of ways. For example in an embodiment in accordance with the invention, FIG. 4 is a graph 400 that illustrates an exemplary calibration or determination of the clearance (e.g., 202) between a slider (e.g., 155) and a disk (e.g., 138) in accordance with various embodiments of the invention. Note that the Y-axis of graph 400 represents a clearance change 402 between the slider and the disk take off height (TOH) 412 while the X-axis represents time 404 progressing from left to right. The linear downward sloping touchdown line 406 can represent the protrusion of the slider 155 at operation 304 as it approaches towards the disk TOH 412 over time 404. It is noted that at operation 304 the protrusion of slider 155 can be non-linear as it approaches towards the disk TOH 412 over time 404. The touchdown line 406 reaches the disk TOH 412, contact onset occurs with the disk at 408. As time passes, the slider 155 remains in actual contact with the disk TOH 412 as indicated by the double headed arrow 410. At some point, the slider 155 takes-off and travels away from the disk TOH 412 over time 404, which is represented by the linear upward sloping take-off line 414. It is pointed out that the actual time in contact 410 between the slider 155 and the disk TOH 412 can be within the timeframe of less than 6 milliseconds or less than one revolution of disk 138, but is not limited to such.

Within FIG. 3, the active fly-height control capability of the slider 155 of operation 304 can be implemented in a wide variety of ways. For example, the active fly-height control capability of the slider 155 can include, but is not limited to, a thermal heater, a piezoelectric actuator, or a voltage between the slider 155 and disk 138. Specifically, if the slider 115 is implemented with a thermal heater, which can be used to enable Thermal Fly-height Control (TFC) of slider 155, the power can be constantly increased to the thermal heater until the slider 155 comes in contact with the disk 138. In another embodiment, if the slider 155 is implemented with a piezo-electric actuator, the voltage to the piezoelectric actuator can be increased until the slider 155 comes in contact with the disk 138. In yet another embodiment, if the slider 155 is implemented with an active fly-height control that is controlled by a voltage between the slider 155 and the disk 138, the voltage can be increased until the slider comes in contact with the disk 138. It is desirable to keep the contact time short (e.g., less than 6 milliseconds) in order to minimize the wear of the slider 155 and to minimize the depletion of disk lubricant that can be caused by the slider 155 removing it.

At operation 306, a determination can be made as to whether the slider is in contact with the disk. If not, process 300 can proceed to repeat the determination of operation 306. However, if it is determined at operation 306 that the slider is in contact with the disk, process 300 can proceed to operation 308. It is appreciated that operation 306 can be implemented in a wide variety of ways. For example, contact can be detected by monitoring the amplitude of the read back signal received from a sensor located on slider 155. Specifically, contact can be detected when the amplitude of the read back signal levels off, or when the amplitude of the read back signal bounces, or when the amplitude of the read back signal levels off and then bounces.

Figure 5:
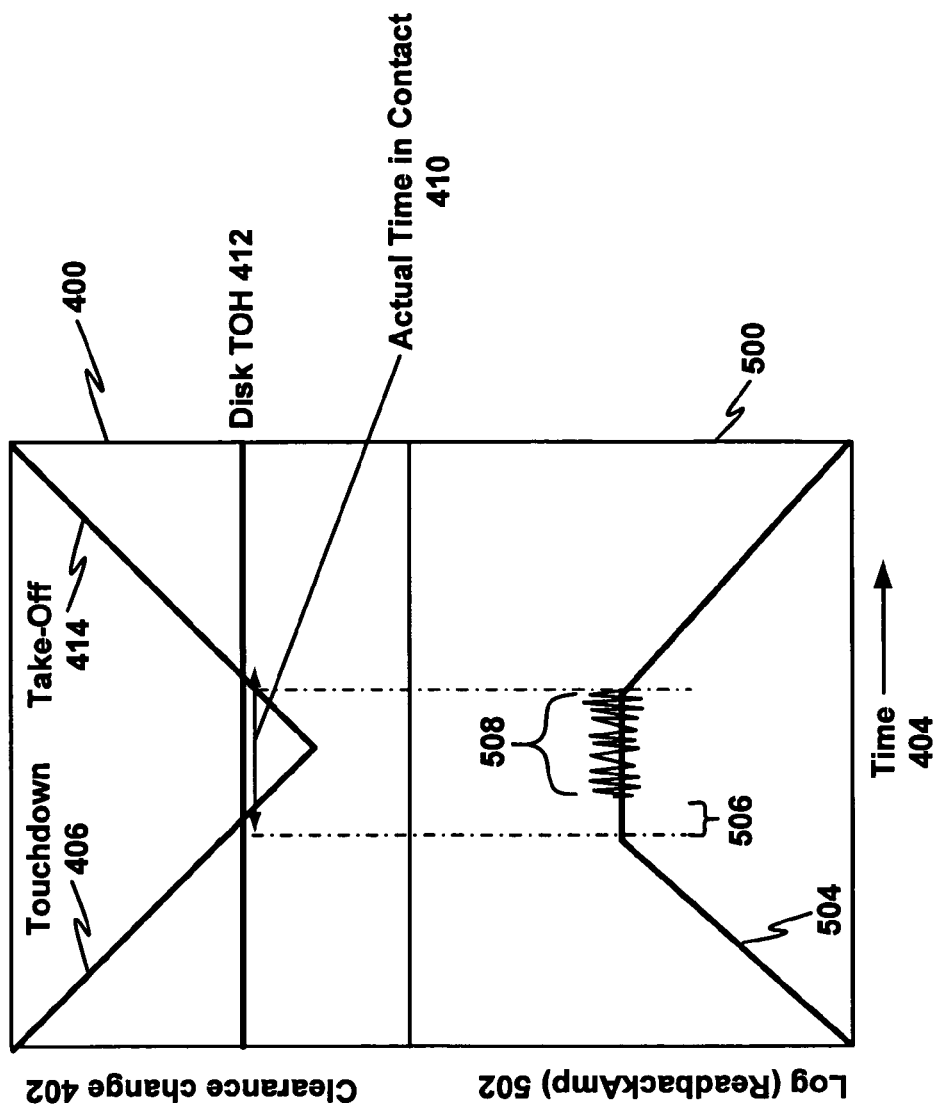
FIG. 5 is a combination diagram of the FIG. 4 graph along with a graph that illustrates an exemplary read back amplitude signal that can be used in accordance with various embodiments of the invention.

It is pointed out that FIG. 5 is a combination diagram of graph 400 of FIG. 4 along with a graph 500 that illustrates an exemplary read back amplitude signal 504 that can be used at operation 306 to detect when the slider 155 is in contact with a disk 138 in accordance with various embodiments of the invention. Note that the Y-axis of graph 500 can represent a logarithm of the read back amplitude signal 502 while the X-axis can represent time 404 progressing from left to right. Within graph 500, the read back amplitude signal 504 exhibits a linear upward slope that corresponds with the touchdown line 406 of graph 400, which can represent the protrusion of the slider 155 as it descends towards the disk TOH 412. Once the slider 155 is in actual contact 410 with the disk 138, note that the read back amplitude signal 504 levels off, as indicated by section 506. It is pointed out that the onset of leveling or asymptoting of the read back amplitude signal 504 is the amount of protrusion of slider 155 that substantially equals the slider disk clearance 202. Instability can build up while the slider 155 is in contact with the disk 138, as shown by the bouncing of the read back amplitude signal 504 indicated by section 508. Note that when the slider 155 take-offs from the disk 138 (as indicated by take-off signal 414), the read back amplitude signal 504 discontinues bouncing and exhibits a linear downward slope. Given what is shown by graph 500, the read back amplitude signal 504 can indicate that the slider 155 is in contact with the disk when it levels off (as shown in section 506) and when the read back amplitude signal 504 rapidly changes or bounces (as shown in section 508).

Note that the bouncing of the read back amplitude signal 504 can occur at within the air bearing frequency range of approximately 100 to 400 kHz. However, conventional arm electronic chips usually include a high pass filter (e.g., at 1 or 2 MHz) to mask out slider vibrations on the read back signal that would vary the signal envelope, which results in screening out the air bearing frequency range. As such, one embodiment to retrieve the slider bouncing frequency range from the read back signal is to utilize a low pass filter/demodulator circuit with an arm electronic chip. Another embodiment can be to utilize a switchable high pass filter with an arm electronic chip that can change from a high pass filter setting (e.g., greater than or equal to 2 MHz) to a low pass filter setting (e.g., less than 2 MHz). For example, the arm electronic chip can switch the high pass filter from approximately 2 MHz to approximately 100 kHz. Yet another embodiment can be to utilize a demodulator circuit together with a switchable high pass filter, as described above.

Figure 6:
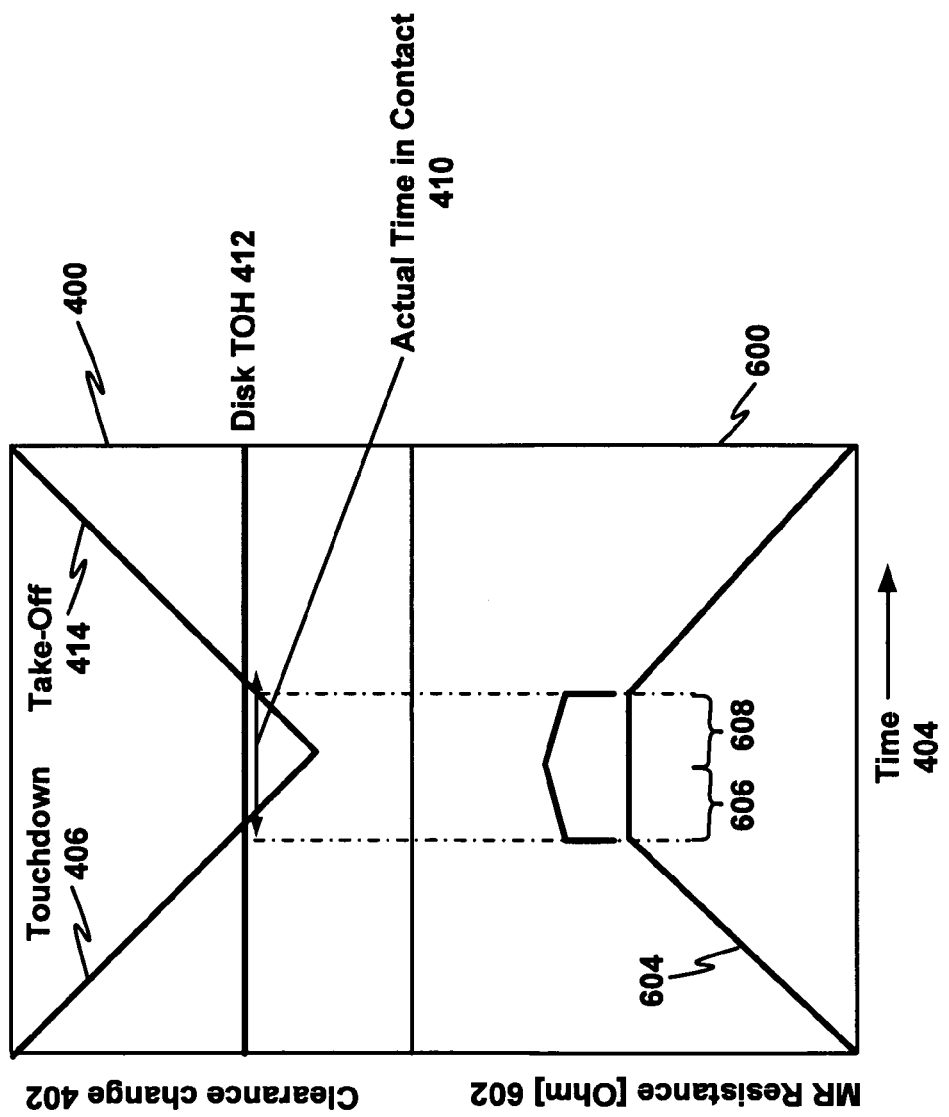
FIG. 6 is a combination diagram of the FIG. 4 graph along with a graph that illustrates an exemplary Magneto Resistance (MR) signal that can be used in accordance with various embodiments of the invention.

Another way, in accordance with the invention, to detect when the slider 155 is in contact with disk 138 at operation 306 is by detecting an increase in MR resistance of the slider 155. For example, FIG. 6 is a combination diagram of graph 400 of FIG. 4 along with a graph 600 that illustrates an exemplary MR resistance signal 604 that can be used at operation 306 to detect when the slider 155 is in contact with a disk 138 in accordance with various embodiments of the invention. Note that the Y-axis of graph 600 can represent the MR resistance in Ohms while the X-axis can represent time 404 progressing from left to right. Within graph 600, the MR resistance signal 604 exhibits a linear upward slope that corresponds with the touchdown line 406 of graph 400, which can represent the protrusion of the slider 155 as it approaches towards the disk TOH 412. Once the slider 155 is in actual contact 410 with the disk 138, note that the MR resistance signal 604 jumps up in value and then has a less steep slope, as indicated by section 606. Note that when the contact of the slider 155 on the disk 138 begins to decrease, the MR resistance signal 604 has a slight downward slope, as indicated by section 608. Furthermore, when the slider 155 takes-off from the disk 138, the MR resistance signal 604 drops down in value (as indicated by the right side of section 608) and then continues to exhibit a linear downward slope. Given what is shown by graph 600, the MR resistance signal 604 indicates that the slider 155 is in contact with the disk 138 when its resistance value jumps up or increases quickly (as shown in section 606) and maintains a higher resistance (as shown in sections 606 and 608).

Figure 7:
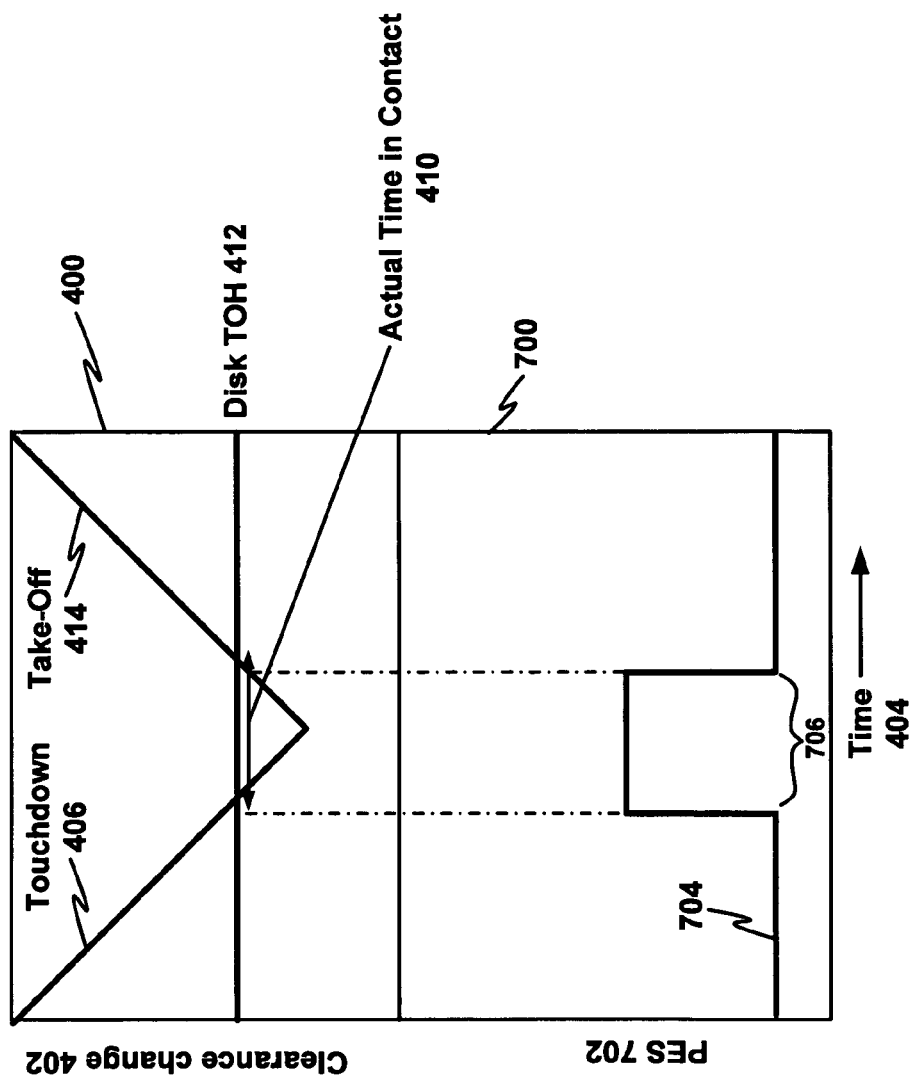
FIG. 7 is a combination diagram of the FIG. 4 graph along with a graph that illustrates an exemplary position error signal (PES) that can be used in accordance with various embodiments of the invention.

Yet another way, in accordance with the invention, to detect when the slider 155 is in contact with disk 138 at operation 306 is by detecting a sharp increase in the position error signal (PES) of slider 155. For example, FIG. 7 is a combination diagram of graph 400 of FIG. 4 along with a graph 700 that illustrates an exemplary position error signal (PES) that can be used to detect when a slider 155 is in contact with a disk 138 in accordance with various embodiments of the invention. Note that the Y-axis of graph 700 can represent the value of the position error signal 702 while the X-axis can represent time 404 progressing from left to right. Within graph 700, the position error signal 704 exhibits a linear flat or level value that corresponds with the touchdown line 406 of graph 400, which can represent the protrusion of the slider 155 as it approaches towards the disk TOH 412. Once the slider 155 is in actual contact 410 with the disk 138, note that the value of the position error signal 704 increases sharply or jumps up and is then level at a higher value, as indicated by section 706. Note that when the slider 155 takes-off from contacting the disk 138, the position error signal 704 drops sharply (as indicated by the right side of section 706) and then continues to exhibit a linear non-changing value. Given what is shown by graph 700, the position error signal 704 indicates that the slider 155 is in contact with the disk 138 when its value increases sharply (as shown in the left side of section 706) and maintains a higher value (as shown in section 706).

Figure 8:
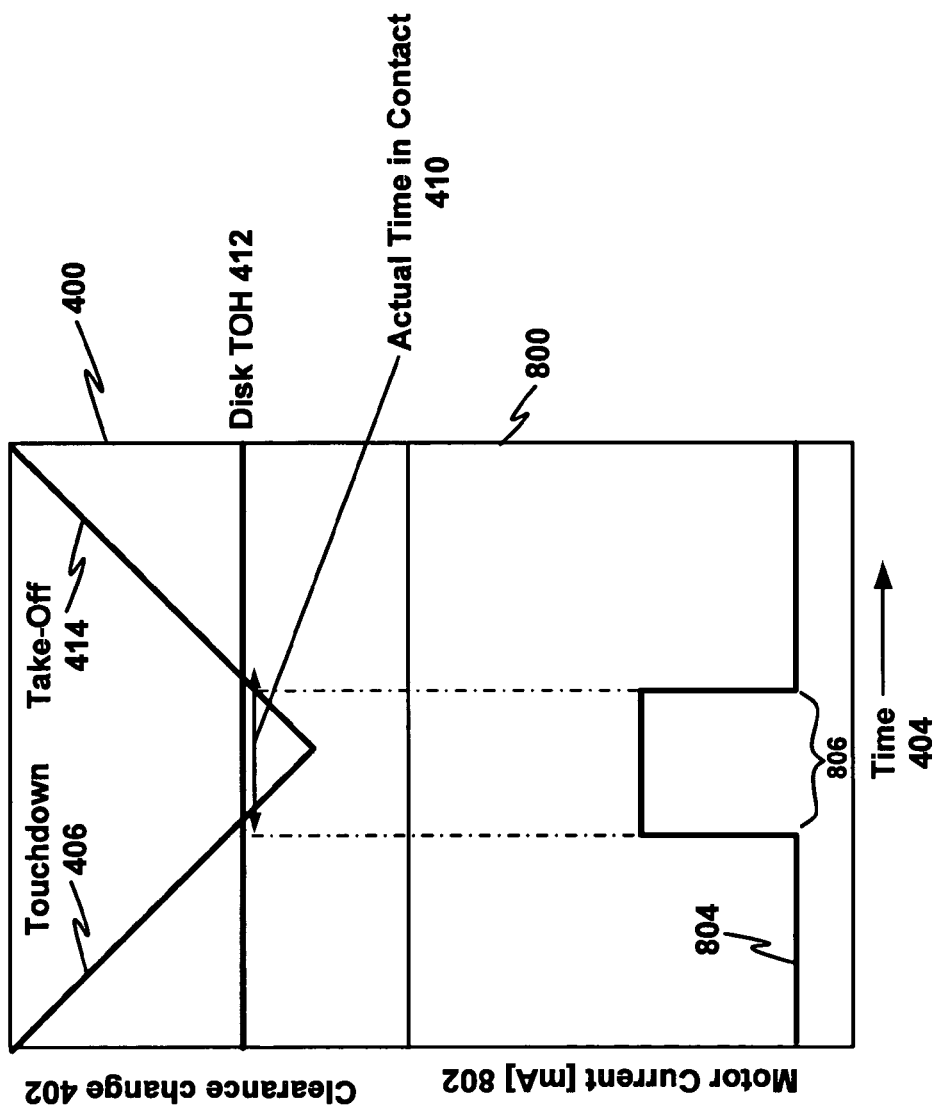
FIG. 8 is a combination diagram of the FIG. 4 graph along with a graph that illustrates an exemplary motor current signal that can be used in accordance with various embodiments of the invention.

Still another way, in accordance with the invention, to detect when the slider 155 is in contact with disk 138 at operation 306 is by detecting an increase in the motor-current 804 of the HDD spindle 130 due to higher friction at the slider 155. For example, FIG. 8 is a combination diagram of graph 400 of FIG. 4 along with a graph 800 that illustrates an exemplary motor current signal 804 of a motor that spins a disk 138 that can be used to detect when a slider 155 is in contact with the disk 138 at operation 306 in accordance with various embodiments of the invention. Note that the Y-axis of graph 800 can represent the value of the motor current 804 in milliamperes (mA) 802 while the X-axis can represent time 404 progressing from left to right. Within graph 800, the motor current signal 804 exhibits a linear flat or level value that corresponds with the touchdown line 406 of graph 400, which can represent the protrusion of the slider 155 as it descends towards the disk TOH 412. Once the slider 155 is in actual contact 410 with the disk 138, note that the value of the motor current signal 804 increases sharply or jumps up and then level at a higher milliampere value, as indicated by section 806. Note that when the slider 155 takes-off from contacting the disk 138, the motor current signal 804 drops sharply (as indicated by the right side of section 806) and then continues to exhibit an unchanging milliampere value. Given what is shown by graph 800, the motor current signal 804 can indicate that the slider 155 is in contact with the disk 138 when its milliampere value increases sharply (as shown in the left side of section 806) and maintains a higher milliampere value (as shown in section 806).

Figure 9:
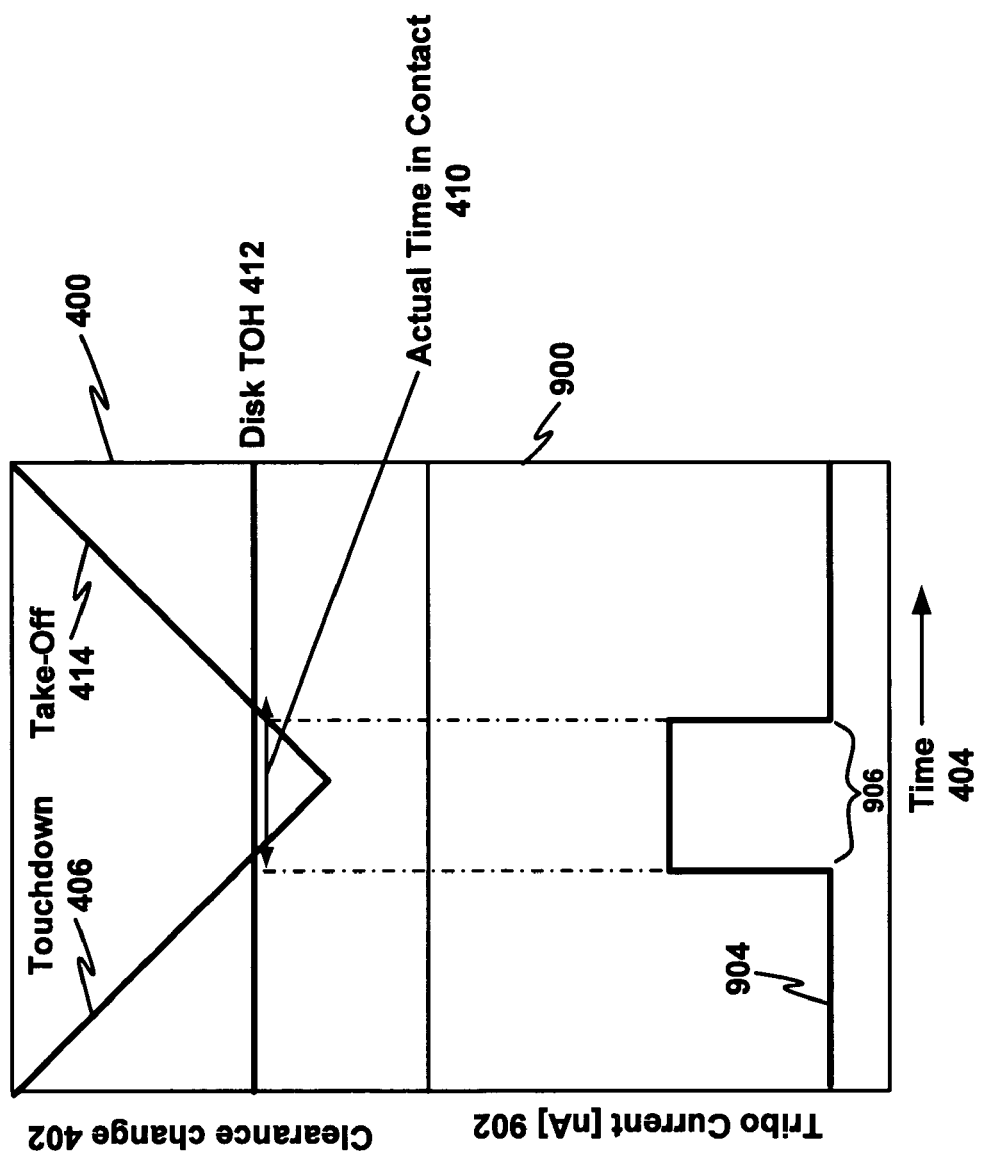
FIG. 9 is a combination diagram of the FIG. 4 graph along with a graph that illustrates an exemplary tribo current signal that can be used in accordance with various embodiments of the invention.

Another way, in accordance with the invention, to detect when the slider 155 is in contact with disk 138 at operation 306 is by detecting an increase in tribo current caused by sliding contact. For example, FIG. 9 is a combination diagram of graph 400 of FIG. 4 along with a graph 900 that illustrates an exemplary tribo current signal 902 that can be used to detect when a slider 155 is in contact with the disk 138 in accordance with various embodiments of the invention. Note that the Y-axis of graph 900 can represent the value of the tribo current 904 in nanoamperes (nA) 802 while the X-axis can represent time 304 progressing from left to right. Within graph 900, the tribo current signal 904 exhibits a linear flat or level value that corresponds with the touchdown line 406 of graph 400, which can represent the protrusion of the slider 155 as it approaches towards the disk TOH 412. Once the slider 155 is in actual contact 410 with the disk 138, note that the value of the tribo current signal 904 increases sharply or jumps up and then levels off at a higher nanoampere value, as indicated by section 906. Note that when the slider 155 takes-off from contacting the disk 138, the tribo current signal 904 drops sharply (as indicated by the right side of section 906) and then continues to exhibit a substantially unchanging value. Given what is shown by graph 900, the tribo current signal 904 can indicate that the slider 155 is in contact with the disk 138 when its nanoampere value increases sharply (as shown in the left side of section 906) and maintains a higher nanoampere value (as shown in section 906).

Note that in an embodiment in accordance with the invention, a modification can be made to HDD 110 in order to enable the measurement of tribo currents of slider 155. For example, the slider 155 can be made electrically insulated to measure tribo currents.

Yet another way, in accordance with the invention, to detect when the slider 155 is in contact with disk 138 at operation 306 is by detecting an increase in voltage of an acoustic emission (AE) signal caused by contact between the slider 155 and disk 138. Still another way, in accordance with the invention, to detect when the slider 155 is in contact with disk 138 at operation 306 is by detecting an increase in millimeters per second of a Laser Doppler velocimetry (LDV) signal caused by contact between the slider 155 and disk 138.

Figure 10:
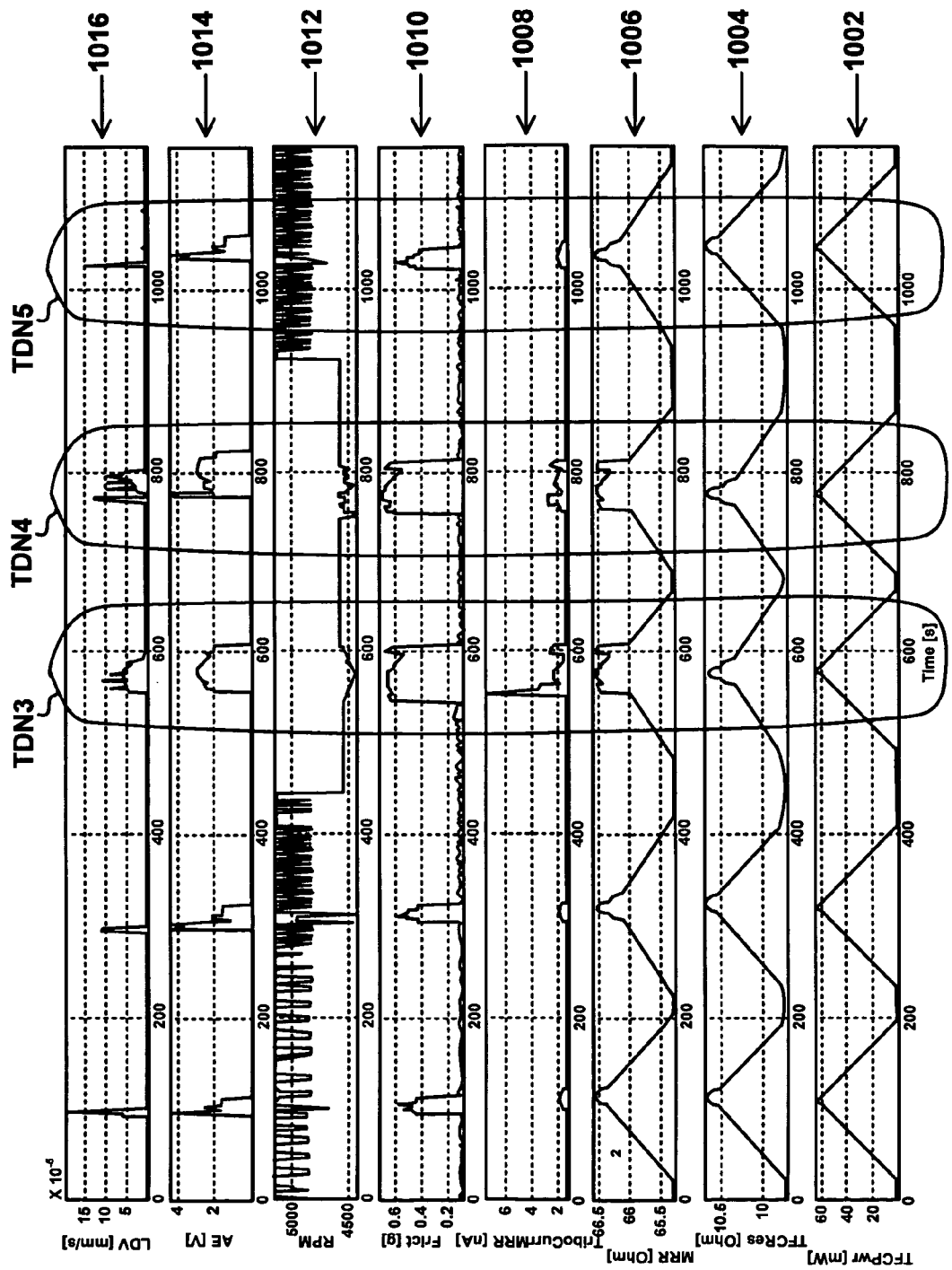
FIG. 10 is a diagram of multiple graphs that represent actual measurements in accordance with various embodiments of the invention.

FIG. 10 is a diagram of multiple graphs that represent actual measurements when a slider (e.g., 155) went in and out of contact multiple times with a disk (e.g., 138) via thermal protrusion in accordance with various embodiments of the invention. Specifically, FIG. 10 includes graph 1002 that illustrates five separate exemplary linear triangular (non-binary) power signals that were sent to a thermal heater of the slider. The Y-axis of graph 1002 represents power in milliwatts (mW). The X-axis of each of graphs 1002, 1004, 1006, 1008,1010, 1012, 1014 and 1016 represents time in seconds (s) that was progressing from left to right. As such, within graph 1002, the timeframe of each linear non-binary power signal is approximately equal to 180 seconds, which corresponds to 90 seconds for the slider to go into contact with the disk and 90 seconds to come out of contact. However, this timeframe is considered very long. For example in one embodiment, the actual time in contact between the slider and the disk can have a duration of less than 6 milliseconds, but is not limited to such. With a timeframe that small, the slider can touchdown onto the disk in drive, be in contact with the disk, and then takeoff all within one revolution of the disk.

It is pointed out that graphs 1004, 1006, 1008, 1010, 1014 and 1016 include measured signals that can be utilized to determine when the slider is in contact with the disk. Specifically, graphs 1004, 1006, 1008, 1010, 1014 and 1016 include measured signals that correspond to each of the linear non-binary power signal of graph 1002. For example, graph 1004 includes five corresponding write resistance signals measured in ohms while graph 1006 includes five corresponding MR resistance signals measured in ohms. Additionally, graph 1008 includes five corresponding tribo current signals measured in nanoamperes (nA) while graph 1010 includes five corresponding friction signals measured in gram force (g). Furthermore, graph 1012 includes five corresponding acoustic emission (AE) signals measured in volts (V) while graph 1014 includes five corresponding Laser Doppler velocimetry (LDV) signals measured in millimeters per second (mm/s). It is appreciated that graph 1012 includes a signal that represents the measured revolutions per minute (RPM) of the HDD disk.

Within FIG. 10, a third touchdown (TDN3) oval indicates the signals of graphs 1004, 1006, 1008, 1010, 1014 and 1016 that correspond to the third time that the slider came into and out of contact with the disk. This third contact occurred when the disk was approximately spinning at 4500 revolutions per minute (rpm), as shown in graph 1012. It is noted that the contact between the slider and the disk can be detected via the write resistance of graph 1004 and the MR resistance of graph 1006 as both those signals amplitudes increase rapidly or jump up. Moreover, it is appreciated from graphs 1008, 1010, 1014 and 1016 that the amplitudes of the tribo current signal, the friction signal, the acoustic emission signal, and the Laser Doppler velocimetry signal, respectively, all increase rapidly or jump up when the slider comes in contact with the disk. It is understood that the signals included within a fourth touchdown (TDN4) oval of graphs 1004, 1006, 1008, 1010, 1014 and 1016 exhibit similar characteristics as those shown in the third touchdown (TDN3) oval. However, the increase in amplitude of the tribo current signal of graph 1008 within the fourth touchdown oval is not as dramatic as the amplitude of the tribo current signal within the third touchdown oval.

A fifth touchdown (TDN5) oval indicates the signals of graphs 1004, 1006, 1008, 1010, 1014 and 1016 that correspond to the fifth time that the slider came into and out of contact with the disk. This fifth contact occurred when the disk was approximately spinning at 5000 revolutions per minute (rpm), as shown in graph 1012. Within the fifth touchdown oval, it is noted that the increase in amplitude of the write resistance signal of graph 1004, the MR resistance signal of graph 1006, the tribo current signal of graph 1008, and the friction signal of graph 1010 are not as dramatic as the amplitude of the corresponding signals within the third and fourth touchdown ovals. From this it is understood that when the disk was operating at the higher 5000 revolutions per minute, the slider did not experience as much contact with the disk as when the disk was operating at the lower 4500 revolutions per minute.

Within FIG. 10, in order to detect the tribo current signal of graph 1008 in various embodiments in accordance with the invention, the slider (e.g., 155) can be electrically isolated from ground. For example in one embodiment, this can be done by having the slider suspended on a gold plate, wherein the gold plate has an extra lead that can be located near the end of the suspension (e.g., 137) of the HDD. Furthermore, the slider 155 can be electrically isolated from ground and/or from the suspension 137 that it is attached to. This electrical isolation can be accomplished in a variety of ways, such as by providing an insulating material between the slider 155 and the suspension 137. In one embodiment of the invention, portions of the suspension 137 can be partially covered with a polyimide film. The polyimide film prevents direct contact between the suspension 137 and the body of the slider 155, and can simultaneously allow isolation of the slider 155 from ground. In one embodiment of the invention, the entire suspension can be isolated from ground, and the slider may or may not be electrically isolated from the suspension.

Figure 11A:
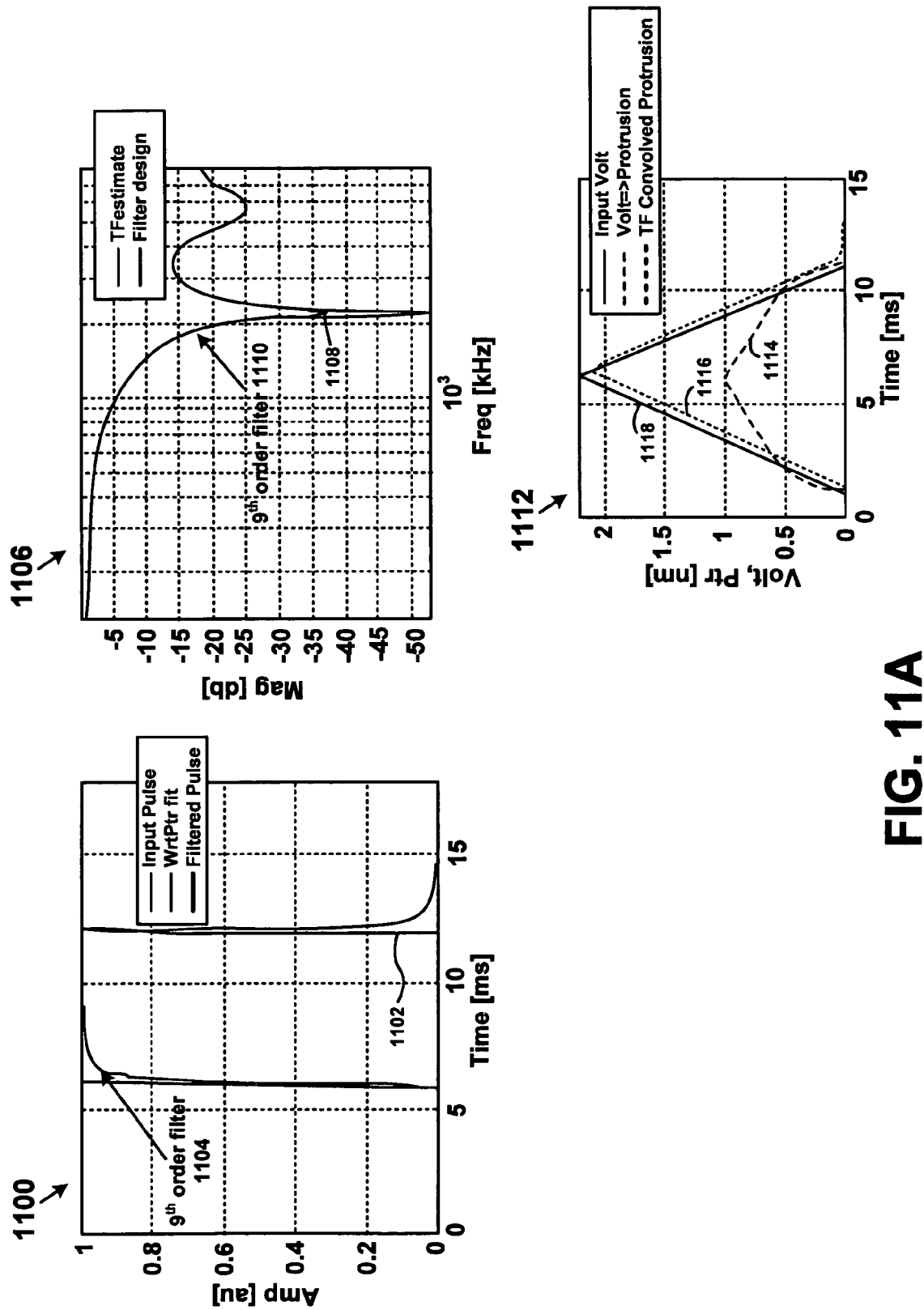
FIGS. 11A and 11B are diagrams that illustrates how to repeatably estimate slider fly height clearance and hysteresis with minimal interference in accordance with embodiments of the invention.
Figure 11B:
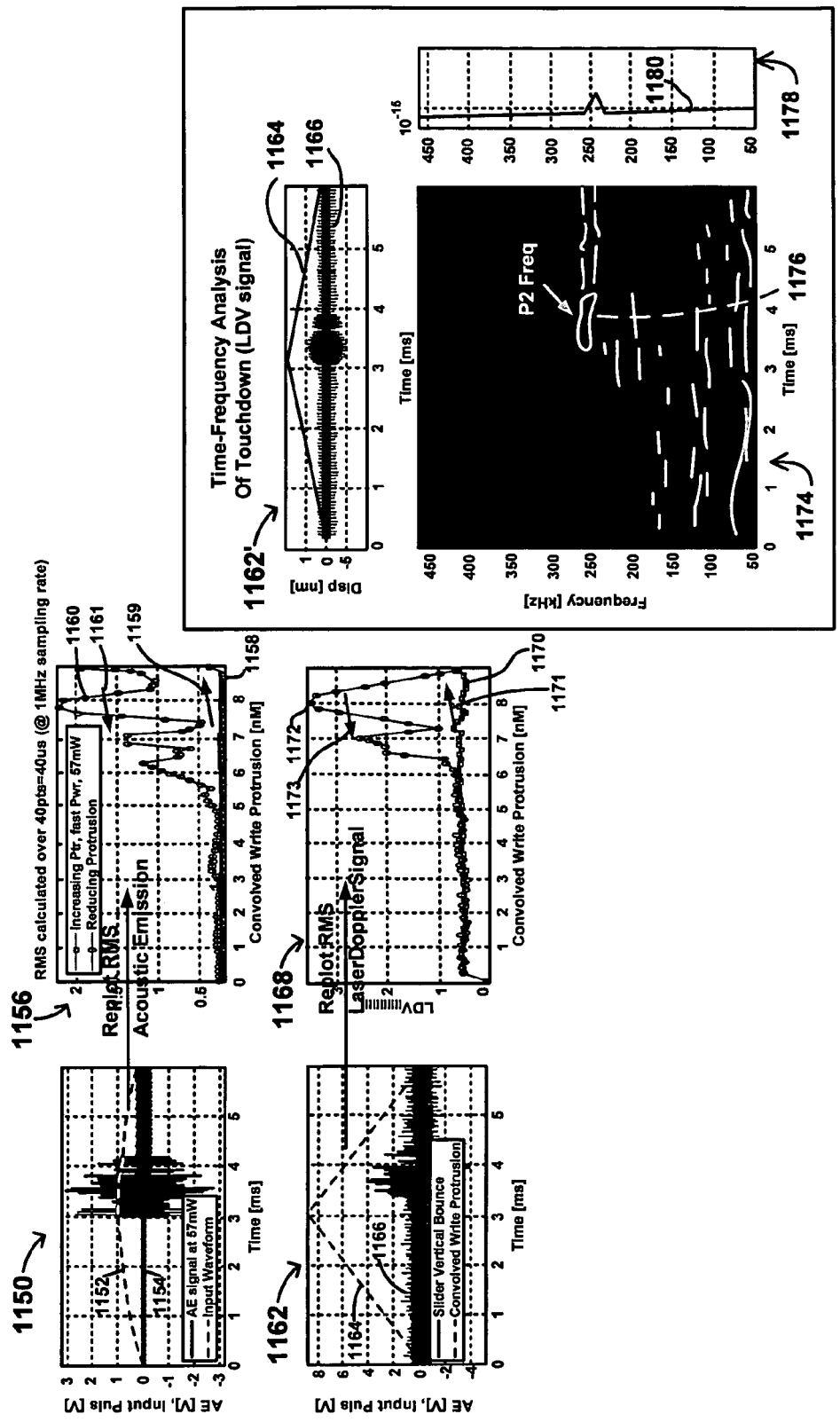

FIGS. 11A and 11B are diagrams that illustrate how to repeatably estimate slider fly height clearance and hysteresis with minimal interference in accordance with embodiments of the invention. However, before estimating (or determining) a slider fly height clearance and hysteresis, it can be desirable to design a transfer function or filter. Specifically, various embodiments in accordance with the invention can input a signal input pulse to a slider active fly-height control that has a duration of less than or equal to one revolution of a disk to estimate (or determine) a slider fly height clearance and hysteresis. Since the input signal pulse has such a short duration, the transfer function can be utilized in order to estimate or determine the slider clearance more accurately.

Specifically, FIG. 11A illustrates how to design a transfer function in accordance with an embodiment of the invention that can actually be performed while a HDD is operating or in-drive. FIG. 11A includes graphs 1100, 1106 and 1112. The graph 1100 includes a binary input pulse signal 1102 that can be applied to an active fly height control of a slider. The Y-axis of graph 1100 represents Ampere while the X-axis represents time in milliseconds (ms). Once the binary pulse 1102 is applied, an actual measurement (WrtPtr fit) can then be made of the write protrusion of the slider (which is obscured from view in graph 1100). Next, a transfer function 1104 (or filter, e.g., $9^{th}$ order filter) can be fit to match the actual measurement of the write protrusion (WrtPtr fit). As such, the write protrusion (WrtPtr fit) measurement signal of graph 1100 is located beneath the transfer function (or $9^{th}$ order filter) 1104.

Graph 1106 illustrates a decibel-frequency analysis in accordance with various embodiments of the invention to determine how well the transfer function (TF) estimate signal 1110 compares to the filter design signal 1108. The Y-axis of graph 1106 represents magnitude in decibels (dB) while the X-axis represents frequency in kilohertz (kHz). From graph 1106 is can be seen that the system bandwidth is less than 2 kHz and that both the TF estimate signal 1110 and the filter design signal 1108 decrease rapidly above 1 kHz. As such, 1 kHz can be approximately equal to 1 ms, which can be the estimated time constant for the slider. Graph 1106 also illustrates that the transfer function 1110 closely matches to the data of the filter design signal 1108.

Within FIG. 11A, once the transfer function has been determined, the transfer function can be applied to the input voltage pulse 1114 of graph 1112. Graph 1112 illustrates an actual protrusion profile of the slider in accordance with various embodiments of the invention. The X-axis of graph 1112 represents time in milliseconds (ms) while its Y-axis represents voltage and protrusion in nanometers (nm). As such, signal 1114 represents the change in amplitude of the input voltage of the active fly-height control of the slider over time while signal 1118 represents the change in amplitude of the volt/protrusion correspondence over time. Additionally, signal 1116 of graph 1112 can represent the change in amplitude of the transfer-function (TF) convolved protrusion over time. It is noted that the TF convolved protrusion signal 1116 is slightly delayed in time in comparison to signal 1118, which can be attributed to the initial delay of the active fly-height control of the slider in causing it to protrude towards the disk.

FIG. 11B includes graphs 1150, 1156, 1162, 1168, 1174 and 1178. The graph 1150 includes a single input voltage waveform pulse 1152 that can be utilized to control an active fly-height control of a slider (e.g., 155). The input waveform pulse 1152 indicates a change in amplitude of voltage (V) in the Y-axis of graph 1150 versus time in milliseconds (ms) in the X-axis. Specifically, the input waveform pulse 1152 goes from zero volts to approximately 1 volt and then returns back to zero. Corresponding to the input voltage pulse 1152, the graph 1150 also includes a signal 1154 that indicates the change in the amplitude of an acoustic emission (AE) voltage (V) in the Y-axis versus time (ms) in the X-axis. As the input voltage pulse 1152 increases from zero to almost 1 volt, the amplitude of AE signal 1154 remains substantially unchanged. However, when the input voltage pulse 1152 is approximately equal to 1 volt (at about 3 ms), the amplitude of AE signal 1154 increases rapidly and changes rapidly indicating that the slider is in contact with the disk. As the input voltage pulse 1152 decreases from 1 volt to 0.8 volts, the amplitude of AE signal 1154 continues to change rapidly indicating that the slider is still in contact with the disk. However, as the input voltage pulse 1152 continues to decrease below 0.8 volts (at about 4.2 ms) to zero volts, the amplitude of AE signal 1154 is greatly reduced indicating that the slider has moved out of contact with the disk.

Graph 1156 is a replotting of the root mean square (RMS) of the acoustic emission (AE) 1154, which illustrates a hysteresis between the touchdown of the slider onto the disk and the takeoff of the slider out of contact of the disk. The Y-axis of graph 1156 represents RMS AE in volts (V) while its X-axis represents convolved write (or TFC) protrusion in nanometers (nm). Note that the RMS was calculated over 40 points that are equal to 40 microseconds at a sampling rate of 1 MHz. As such, graph 1156 includes an increasing convolved protrusion signal 1158 that progresses in nanometers along the X-axis from left to right (as indicated by arrow 1159) that represents the protrusion of the slider. At approximately 8.5 nm the increasing convolved protrusion signal 1158 increases sharply, thereby indicating that the slider came into contact with the disk. Graph 1156 also includes a reducing convolved protrusion signal 1160 that progresses from right to left (as indicated by arrow 1161) that represents the retraction of the slider. At approximately 6 nm the reducing protrusion signal 1160 decreases towards zero, thereby indicating that the slider came out of contact with the disk. Therefore, in accordance with one embodiment of the invention, graph 1156 illustrates a hysteresis between the touchdown of the slider onto the disk at approximately 8.5 nm and the takeoff of the slider from the disk at approximately 6 nm. Based on the information of graph 1156, the advisable inactive fly-height for the slider is less than 6 nm of protrusion. Furthermore, the advisable slider grazing contact (or quasi-contact) for read/write operations can be approximately 8.5 nm.

FIG. 11B also includes a graph 1162 that corresponds to graph 1150. Specifically, graph 1162 includes a convolved write (or TFC) protrusion signal 1164 that represents the protrusion of the slide (e.g., 155) based on the input signal 1152 (of graph 1150) utilized to control the active fly-height control of the slider. The convolved write protrusion signal 1164 indicates a change in convolved protrusion in nanometers (nm) in the Y-axis of graph 1162 versus time (ms) in the X-axis. Specifically, the convolved write protrusion signal 1164 goes from zero nm to approximately 8.5 nm and then returns back to zero. Corresponding to the convolved write protrusion signal 1164, graph 1162 also includes a slider vertical bounce signal 1166 that indicates the change in the amplitude of a Laser Doppler velocimetry (LDV) in nanometers in the Y-axis versus time (ms) in the X-axis. As the convolved write protrusion signal 1164 linearly increases from zero to about 8.5 nm, the amplitude of LDV signal 1166 remains substantially unchanged. However, when the convolved write protrusion signal 1164 is equal to 8.5 nm (at about 3.1 ms), the amplitude of LDV signal 1166 increases rapidly and changes rapidly indicating that the slider is in contact with the disk. As convolved write protrusion signal 1164 decreases from 8.5 nm to approximately 6.5 nm, the amplitude of LDV signal 1166 continues to change rapidly indicating that the slider is still in contact with the disk. However, as the convolved write protrusion signal 1164 continues to decrease below 6.5 nm (at about 4.1 ms) to zero volts, the amplitude of LDV signal 1166 is greatly reduced indicating that the slider has moved out of contact with the disk.

Graph 1168 is a replotting of the root mean square (RMS) of the LDV signal 1164, which illustrates a hysteresis between the touchdown of the slider onto the disk and the takeoff of the slider out of contact of the disk. The Y-axis of graph 1156 represents RMS LDV in nanometers (nm) while its X-axis represents convolved write (or TFC) protrusion (nm). Note that the RMS of graph 1168 was calculated over 40 points that are equal to 40 microseconds at a sampling rate of 1 MHz. As such, graph 1168 includes an increasing convolved write protrusion signal 1170 that progresses in nanometers along the X-axis from left to right (as indicated by arrow 1171) that represents the convolved protrusion of the slider. At approximately 8.5 nm the increasing convolved protrusion signal 1170 increases sharply, thereby indicating that the slider came into contact with the disk. Graph 1168 also includes a reducing convolved protrusion signal 1172 that progresses from right to left (as indicated by arrow 1173) that represents the retraction of the slider. At approximately 6.5 nm the reducing protrusion signal 1172 decreases towards 0.5 nm, thereby indicating that the slider came out of contact with the disk. Therefore, in accordance with one embodiment of the invention, graph 1168 illustrates a hysteresis between the touchdown of the slider onto the disk at approximately 8.5 nm and the takeoff of the slider from the disk at approximately 6.5 nm. Based on the information of graph 1168, the advisable inactive minimal fly-height for the slider can be less than 6.5 nm of protrusion. Furthermore, the advisable slider grazing contact (or quasi-contact) for read/write operations can be approximately 8.5 nm. Therefore, touchdown and takeoff hysteresis can be observed, which can be used to better determine the minimal fly height for the slider. It is noted that hysteresis can be difficult to detect with a disk that has a rough surface, which is typically not the case with today's current disk technology.

FIG. 11B also includes graph 1174 which is a time-frequency analysis of the slider touchdown and takeoff with a disk in accordance with various embodiments of the invention. Note that graph 1174 is based on the LDV signal 1166 of graph 1162. The Y-axis of graph 1174 represents a slider vibration (or bouncing) frequency in kilohertz while the X-axis represents time in milliseconds. It is pointed out that graph 1174 corresponds to graph 1162' (which is a smaller version of graph 1162) located directly above it. Furthermore, graph 1174 also corresponds to graph 1178 which includes a frequency signal 1180 measured in kilohertz. Graph 1174 includes a slider contact signature 1176 indicating the slider (e.g., 155) coming into and out of contact with the disk (e.g., 138). It is noted that slider contact signature 1176 corresponds with the rapid changing amplitude of the LDV signal 1166 shown in graph 1162'. Additionally, the slider contact signature 1176 occurs at a slider vibration of approximately 250 kHz (which is within the air bearing vibration) as shown in graph 1174 and by signal 1180 of graph 1178. As such, as the slider touches down with the disk, at that point it can be vibrating at an air bearing mode. Moreover, the slider contact signature 1176 is the Pitch 2 (P2) frequency that is to be detected in accordance with embodiments of the invention to determine whether the slider is in contact with the disk.

It is noted that one or more of the above listed detection techniques can be utilized at operation 306 in order to determine whether the slider is in contact with the disk.

At operation 308 of FIG. 3, the value of the touchdown power and/or voltage input into the active fly-height control capability of the slider can be stored. It is pointed out that the touchdown power and/or voltage are the amount of power and/or voltage utilized with the active fly-height control capability that caused the slider to make contact with the disk. Operation 308 can be implemented in a wide variety of ways. For example, the touchdown power and/or voltage can be stored at operation 308 in any manner similar to that described herein, but is not limited to such.

At operation 310, the slider is then caused to take-off from the disk by part of the single non-binary pulse of power and/or voltage input into the active fly-height control capability of the slider. Note that operation 310 can be implemented in a wide variety of ways. For example in one embodiment, part of the single input non-binary pulse of power and/or voltage input into the active fly-height control can cause the slider to gradually take-off from the disk. It is pointed out that by causing the slider to gradually go into and out of contact with the disk, hysteresis between the touchdown of the slider onto the disk and the takeoff of the slider from the disk can be determined, as described herein. The slider can be caused to take-off from the disk by part of the single non-binary pulse of power and/or voltage input into the active fly-height control capability of the slider at operation 310 in any manner similar to that described herein, but is not limited to such.

At operation 312, a determination can be made as to whether external conditions have changed for the HDD (e.g., 110) that might offset the original calibration. If not, process 300 can proceed to repeat operation 312. However, if it is determined at operation 312 that external conditions have changed, process 300 can proceed to operation 304. Note that operation 312 can be implemented in a wide variety of ways. For example, the external conditions at operation 312 can include, but are not limited to, shock to the HDD, temperature, humidity, altitude, and/or other environmental conditions. Note that a determination at operation 312 can be made as to whether external conditions have changed for the HDD in any manner similar to that described herein, but is not limited to such.

Within FIG. 3, it is pointed out that once the value of the touchdown power and/or voltage is determined, it can be utilized to actively set the desired fly-height (or clearance) 202 of the slider 155. It is further noted that the method 300 of calibrating the actual clearance of each slider 155 can be performed while the HDD 110 is operating, commonly known as "in drive".

Figure 12A:
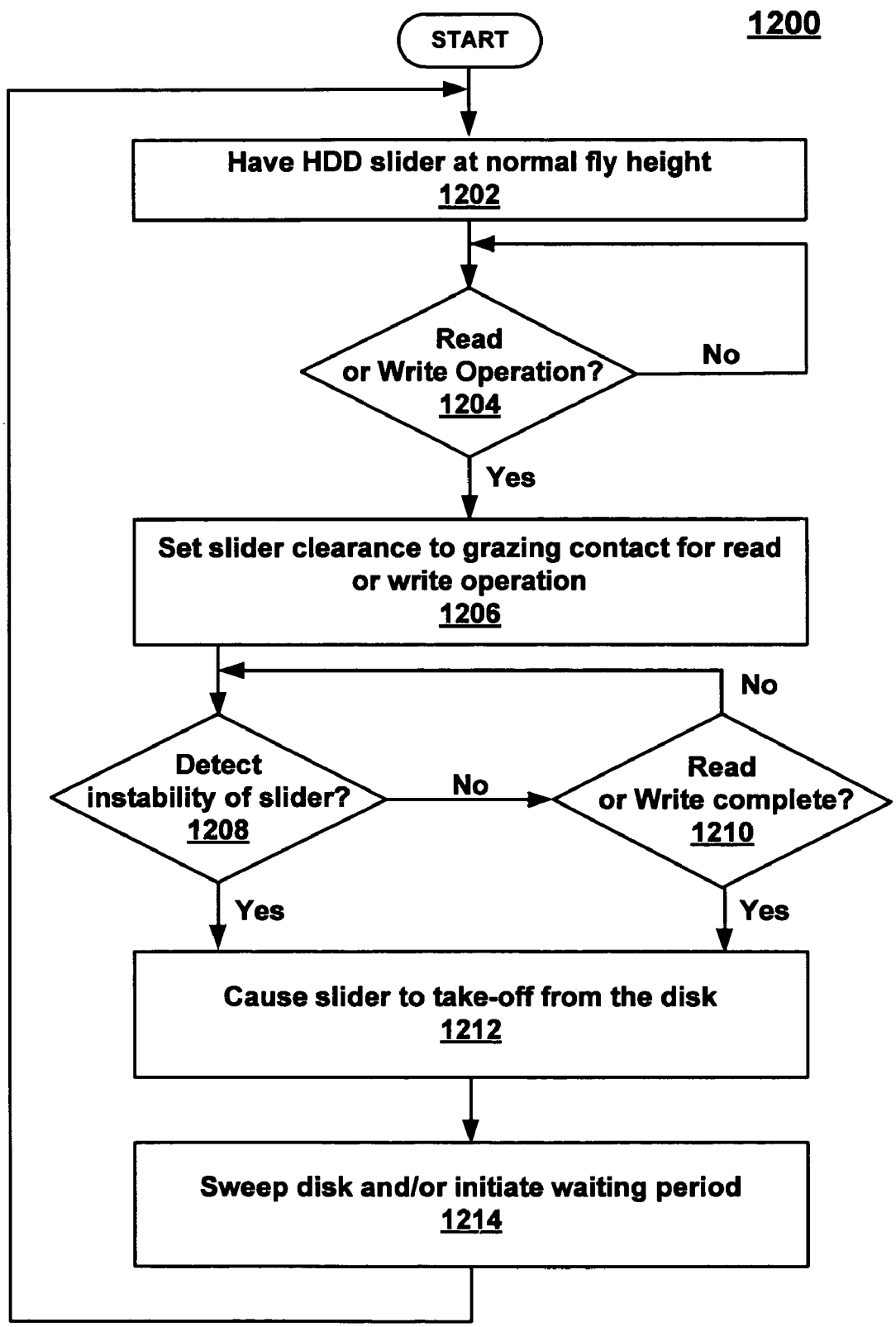
FIG. 12A is another flow diagram in accordance with various embodiments of the invention.

FIG. 12A is a flow diagram of an exemplary method 1200 in accordance with various embodiments of the invention for enabling on-demand intermittent contact read and/or write operations within a HDD. Method 1200 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 1200, such operations are exemplary. Method 1200 may not include all of the operations illustrated by FIG. 12A. Also, method 1200 may include various other operations and/or variations of the operations shown by FIG. 12A. Likewise, the sequence of the operations of method 1200 can be modified. It is noted that the operations of method 1200 can be performed manually, by software, by firmware, by electronic hardware, or by any combination thereof.

Specifically, method 1200 can include having a HDD slider located at its normal or a desired fly height. A determination can be made as to whether the HDD slider is to perform a read or write operation. If not, the determination can be repeated. However, if it is determined that the HDD slider is to perform a read or write operation, an active fly-height control capability of the slider can be used to set the slider clearance to a grazing contact with a disk so that the slider can perform a contact read or write operation. A determination can be made as to whether the slider is experiencing any instability while in contact with the disk. If so, the active fly-height control capability of the slider can be utilized to cause the slider to take-off from and out of contact with the disk. However, if it is determined that the slider is not experiencing instability while in contact with the disk, a determination can be made as to whether the read or write operation has been completed by the slider. If not, the instability determination can be repeated. However, if it is determined that the read or write operation has been completed by the slider, the active fly-height control capability of the slider can be utilized to cause the slider to take-off from and out of contact with the disk. After which, that particular disk section of the disk can be swept and/or a waiting period can be initiated on the track that was being read or written before causing the slider to return to grazing contact on the disk. Subsequently, the slider can be located at its normal or a desired fly height. In this manner, method 1200 can enable on-demand intermittent contact read and write operations within a HDD.

At operation 1202 of FIG. 12A, a HDD slider (e.g., 155) can be located at its normal or desired fly height (e.g., 202) via an active fly-height control capability or device of the slider. The slider 155 can be implemented with an active fly-height control device or capability thereby enabling the slider 155 to be put in and out of contact a disk (e.g., 138) on-demand. It is appreciated that operation 1202 can be implemented in a wide variety of ways. For example in various embodiments in accordance with the invention, the active fly-height control capability (or device) of the slider can be implemented in any manner similar to that described herein, but is not limited to such. It is noted that the slider can be located at its normal or desired fly height at operation 1202 in any manner similar to that described herein, but is not limited to such.

At operation 1204, a determination can be made as to whether the HDD slider is to perform a read or write operation. If not, process 1200 can proceed to repeat operation 1204. However, if it is determined at operation 1204 that the HDD slider is to perform a read or write operation, process 1200 can proceed to operation 1206. Note that operation 1204 can be implemented in a wide variety of ways. For example, operation 1204 can be implemented in any manner similar to that described herein, but is not limited to such.

At operation 1206 of FIG. 12A, an active fly-height control capability of the slider can be used to set the slider clearance to a grazing contact or quasi-contact with the disk to enable the slider to perform a contact read or write operation. It is understood that operation 1206 can be implemented in a wide variety of ways. For example in various embodiments in accordance with the invention, the slider 155 can go into and out of contact with the disk 138 at operation 1206 by actively controlling the protrusion of slider 155 extremely accurately (e.g., wherein the defined level of interference can be approximately 1 Angstrom). In various embodiments, a stored or known touchdown power and/or voltage (e.g., as calibrated in method 300 of FIG. 3) can be utilized with the active fly-height control capability of the slider at operation 1206 to set the slider clearance to a grazing contact or quasi-contact with the disk to enable the slider to perform a contact read or write operation. Operation 1206 can be implemented in any manner similar to that described herein, but is not limited to such.

At operation 1208, a determination can be made as to whether the slider is experiencing any instability while in contact with the disk. It is noted that the slider 155 can stay in contact (or grazing contact or quasi-contact) with the disk 138 in order to perform read and/or write operations until instability develops in the head-disk interface of slider 155 (e.g., which can occur within milliseconds to seconds time frame). If it is determined at operation 1208 that the slider is not experiencing any instability, process 1200 can proceed to operation 1210. However, if it is determined at operation 1208 that the slider is experiencing instability while in contact with the disk, process 1200 can proceed to operation 1212. It is appreciated that operation 1208 can be implemented in a wide variety of ways. For example, once the slider 155 is in grazing contact or quasi-contact with the disk 138, the read back signal (e.g., 504) or motor current (e.g., 804) can be monitored at operation 1208 in order to determine when the slider 138 begins having instability or bouncing on the disk 138. In various embodiments in accordance with the invention, a feedback loop can be implemented at operation 1208 that monitors one or more contact detection methods in order to detect instability or bouncing in the head-disk interface of the slider 155. Operation 1208 can be implemented in any manner similar to that described herein, but is not limited to such.

With regard to operation 1208, it is pointed out that there are a variety of factors that can affect whether there is stable grazing contact (or quasi-contact) between the slider 155 and the disk 138. For example, one factor can be dynamic pitch of the slider 155 while another factor can be the level of interference between the slider 155 and the disk 138. Yet another factor that can affect whether there is stable grazing contact (or quasi-contact) is the amount of time the slider 155 is in contact with the disk 138. As such, shorter contact times can reduce the likelihood of HDI instability of the slider 155. Furthermore, another factor can be the air bearing design of the slider 155 (e.g., damping, trailing pad size, and the like). Another factor can be that a lubricant on the disk 138 can develop ripples when the slider 155 is in contact with the disk 138 in the millisecond time frame. Moreover, another factor can be that lubricant on the disk 138 can be depleted, such as, at large levels of interference leading to increased van der Waals forces. Also, HDI instability of the slider 155 can be caused by lubricant and debris pickup transfer between the slider 155 and the disk 138. Moreover, HDI instability of the slider 155 can be caused by factors external to the HDD 110, such as, shock, temperature, and humidity, but is not limited to such.

At operation 1210 of FIG. 12A, a determination can be made as to whether the read or write operation has been completed by the slider. If not, process 1200 can proceed to operation 1208. However, if it is determined at operation 1210 that the read or write operation has been completed by the slider, process 1200 can proceed to operation 1212. It is noted that operation 1210 can be implemented in a wide variety of ways. For example, operation 1210 can be implemented in any manner similar to that described herein, but is not limited to such.

At operation 1212, the active fly-height control capability of the slider can be triggered to cause the slider to take-off from and out of contact with the disk. It is understood that operation 1212 can be implemented in a wide variety of ways. For example, the power and/or voltage to the active fly-height control of the slider 155 can be reduced, thereby causing the slider 155 to move away from the disk 138 resulting in an increase of the fly-height 202 of the slider 155. Operation 1212 can be implemented in any manner similar to that described herein, but is not limited to such.

At operation 1214 of FIG. 12A, the disk can be swept and/or a waiting period can be initiated before causing the slider to return to grazing contact on the disk. It is pointed out that operation 1214 can be implemented in a wide variety of ways. For example in various embodiments in accordance with the invention, the particular disk section of disk 138 that was being read or written can be swept or a waiting period (e.g., approximately 1 to 60 seconds) can be initiated on the track that was being read or written before causing the slider 155 to return to grazing contact on the disk 138. Operation 1214 can be implemented in any manner similar to that described herein, but is not limited to such. Once operation 1214 is completed, process 1200 can proceed to operation 1202.

It is pointed out that the read/write element 156 of the slider 155 may experience wear due to read/write contact with the disk 138 in method 1000 and due to the clearance calibration process of method 300. It is noted that this type of wear can be minimized due to very short contact time (e.g., millisecond time frame).

Within FIG. 12A, in accordance with an embodiment of the invention, it is noted that operation 1210 may not be included as part of method 1200. As such, if it is determined at operation 1208 that the slider is not experiencing any instability, process 1200 can proceed to repeat operation 1208.

Figure 12B:
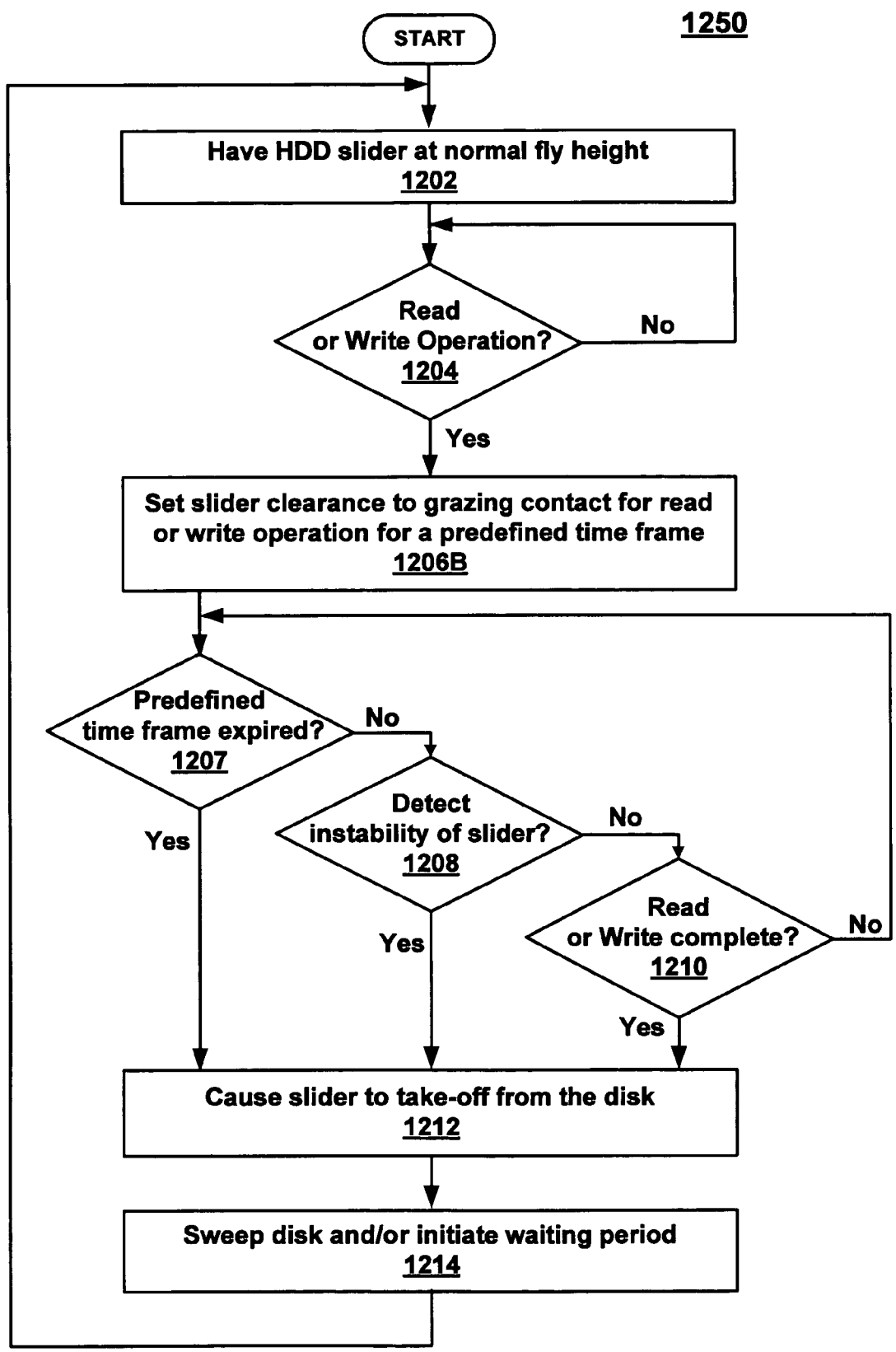
FIG. 12B is another flow diagram in accordance with various embodiments of the invention.

FIG. 12B is a flow diagram of an exemplary method 1250 in accordance with various embodiments of the invention for enabling on-demand intermittent contact read and/or write operations within a HDD. Method 1250 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 1250, such operations are exemplary. Method 1250 may not include all of the operations illustrated by FIG. 12B. Also, method 1250 may include various other operations and/or variations of the operations shown by FIG. 12B. Likewise, the sequence of the operations of method 1250 can be modified. It is noted that the operations of method 1250 can be performed manually, by software, by firmware, by electronic hardware, or by any combination thereof.

Specifically, method 1250 can include having a HDD slider located at its normal or a desired fly height. A determination can be made as to whether the HDD slider is to perform a read or write operation. If not, the determination can be repeated. However, if it is determined that the HDD slider is to perform a read or write operation, an active fly-height control capability of the slider can be used to set the slider clearance to a grazing contact or quasi-contact with the disk for a predefined time frame to enable the slider to perform a contact read or write operation. A determination can be made as to whether the predefined time frame has expired. If so, the active fly-height control capability of the slider can be utilized to cause the slider to take-off from and out of contact with the disk. However, if it is determined that the predefined time frame has not expired, a determination can be made as to whether the slider is experiencing any instability while in contact with the disk. If so, the active fly-height control capability of the slider can be utilized to cause the slider to take-off from and out of contact with the disk. However, if it is determined that the slider is not experiencing instability while in contact with the disk, a determination can be made as to whether the read or write operation has been completed by the slider. If not, the predefined time frame determination can be repeated. However, if it is determined that the read or write operation has been completed by the slider, the active fly-height control capability of the slider can be utilized to cause the slider to take-off from and out of contact with the disk. After which, that particular disk section of the disk can be swept and/or a waiting period can be initiated on the track that was being read or written before causing the slider to return to grazing contact on the disk. Subsequently, the slider can be located at its normal or a desired fly height. In this manner, method 1250 can enable on-demand intermittent contact read and write operations within a HDD.

It is noted that operations 1202, 1204, 1208, 1210, 1212 and 1214 of FIG. 12B are similar to operations 1202, 1204, 1208, 1210, 1212 and 1214 of FIG. 12A. However, if it is determined at operation 1204 of FIG. 12B that the HDD slider is to perform a read or write operation, process 1250 can proceed to operation 1206B. Furthermore, if it is determined at operation 1210 of FIG. 12B that the read or write operation has not been completed by the slider, process 1250 can proceed to operation 1207.

At operation 1206B of FIG. 12B, an active fly-height control capability of the slider can be used to set the slider clearance to a grazing contact or quasi-contact with the disk for a predefined time frame to enable the slider to perform a contact read or write operation. It is understood that operation 1206B can be implemented in a wide variety of ways. For example in various embodiments in accordance with the invention, the predefined time frame at operation 1206B can be based on a limited time frame (e.g., as determined in method 1300 of FIG. 13) wherein the slider can be in grazing contact or quasi-contact with the disk without experiencing any instability or any substantial instability. In various embodiments, a binary power pulse having a predefined time frame (e.g.,. 500 µs, 1 ms, and the like) can be input to an active fly-height control (e.g., a TFC coil) of the slider at operation 1206B to cause the slider to go into grazing contact or quasi-contact with the disk to enable the slider to perform a contact read or write operation. In various embodiments, the slider 155 can go into and out of contact with the disk 138 at operation 1206B for a predefined time frame by actively controlling the protrusion of slider 155 extremely accurately (e.g., wherein the defined level of interference can be approximately 1 Angstrom). In various embodiments, a stored or known touchdown power and/or voltage (e.g., as calibrated in method 300 of FIG. 3) can be utilized with the active fly-height control capability of the slider for a predefined time frame at operation 1206B to set the slider clearance to a grazing contact or quasi-contact with the disk for the predefined time frame to enable the slider to perform a contact read or write operation. Operation 1206B can be implemented in any manner similar to that described herein, but is not limited to such.

At operation 1207, a determination can be made as to whether the predefined time frame has expired. If not, process 1250 can proceed to operation 1208. However, if it is determined at operation 1207 that the predefined time frame has expired, process 1250 can proceed to operation 1212. It is appreciated that operation 1207 can be implemented in a wide variety of ways. For example in various embodiments, operation 1207 can be implemented in any manner similar to that described herein, but is not limited to such.

Within FIG. 12B, in accordance with various embodiments of the invention, it is noted that operation 1208 or operation 1210 or both may not be included as part of method 1250. For example in an embodiment, given operations 1208 and 1210 are not included, if it is determined at operation 1207 that the predefined time frame has not expired, process 1250 can proceed to repeat operation 1207. Furthermore in an embodiment, given operation 1210 is not included, if it is determined at operation 1208 that the slider is not experiencing any instability, process 1200 can proceed to operation 1207. Moreover in an embodiment, given operation 1208 is not included as part of method 1250, if it is determined at operation 1207 that the predefined time frame has not expired, process 1250 can proceed to operation 1210.

Figure 13:
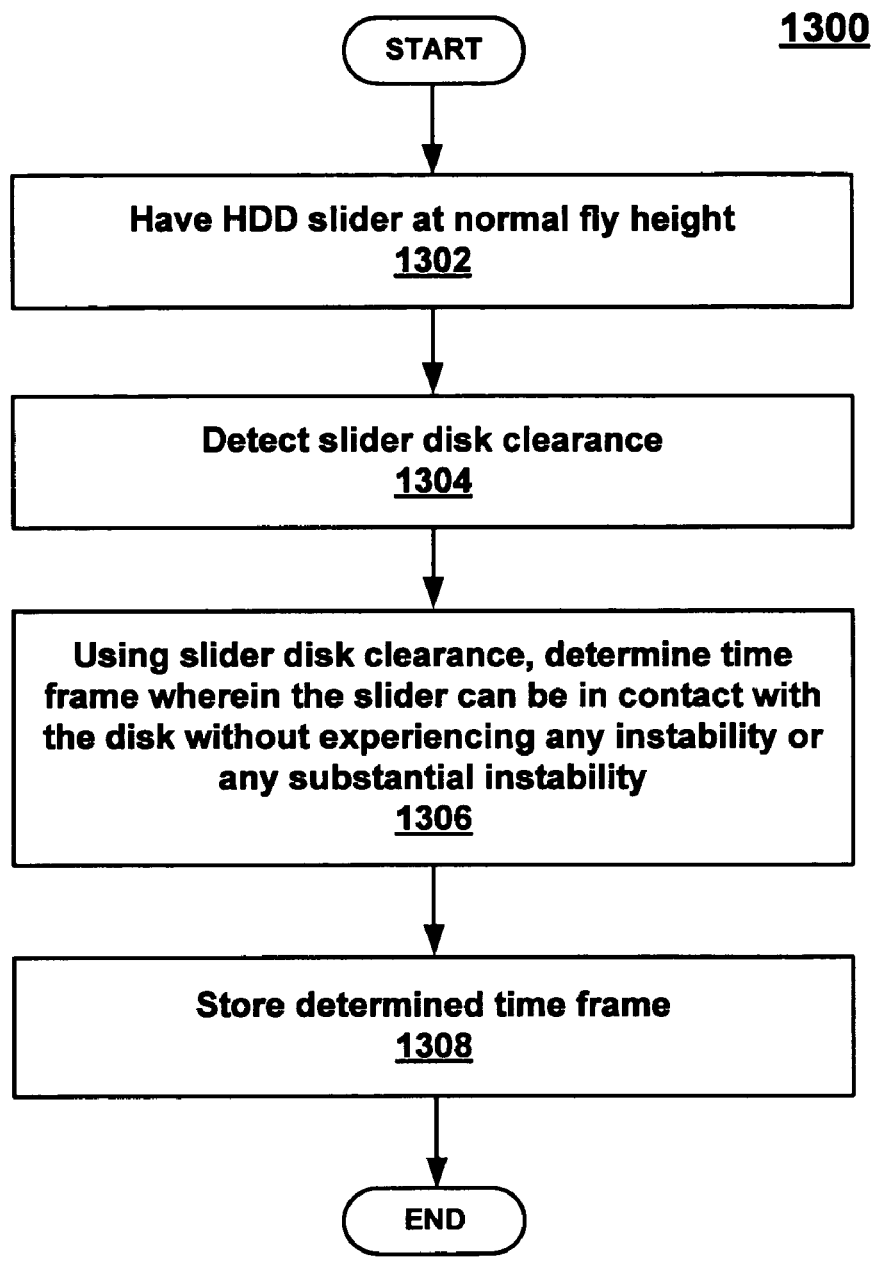
FIG. 13 is yet another flow diagram in accordance with various embodiments of the invention.

FIG. 13 is a flow diagram of an exemplary method 1300 in accordance with various embodiments of the invention for determining a time frame wherein a HDD slider can be in contact with a disk without experiencing any instability or any substantial instability. Method 1300 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 1300, such operations are exemplary. Method 1300 may not include all of the operations illustrated by FIG. 13. Also, method 1300 may include various other operations and/or variations of the operations shown by FIG. 13. Likewise, the sequence of the operations of method 1300 can be modified. It is noted that the operations of method 1300 can be performed manually, by software, by firmware, by electronic hardware, or by any combination thereof.

Specifically, method 1300 can include having a HDD slider located at its normal or a desired fly height. A slider disk clearance can be detected or determined. Utilizing the slider disk clearance, it can be determined how long (time frame) the slider can be in contact with the disk without experiencing any instability or any substantial instability. The determined time frame can then be stored.

At operation 1302 of FIG. 13, a HDD slider (e.g., 155) can be located at its normal or desired fly height (e.g., 202) via an active fly-height control capability or device of the slider. The slider 155 can be implemented with an active fly-height control device or capability thereby enabling the slider 155 to be put in and out of contact a disk (e.g., 138) on-demand. It is appreciated that operation 1302 can be implemented in a wide variety of ways. For example in various embodiments in accordance with the invention, the active fly-height control capability (or device) of the slider can be implemented in any manner similar to that described herein, but is not limited to such. It is noted that the slider can be located at its normal or desired fly height at operation 1302 in any manner similar to that described herein, but is not limited to such.

At operation 1304, a slider disk clearance can be detected or determined. It is understood that detecting or determining the slider disk clearance at operation 1304 can be implemented in a wide variety of ways. For example in various embodiments, the slider disk clearance can be detected or determined using a single non-binary pulse (e.g., voltage and/or power) in order to bring the slider into and out of contact with the disk at operation 1304 in any manner similar to that described herein, but is not limited to such. In various embodiments, the slider disk clearance can be detected or determined using one or more binary pulses (e.g., voltage and/or power) to bring the slider into and out of contact with the disk at operation 1304.

At operation 1306 of FIG. 13, utilizing the slider disk clearance, it can be determined how long (time frame) the slider can be in contact with the disk without experiencing any instability, or any substantial instability, or any bouncing or any substantial bouncing. It is noted that operation 1306 can be implemented in a wide variety of ways. For example, FIG. 14 illustrates a method for determining the time frame at operation 1306 in accordance with various embodiments of the invention.

Figure 14:
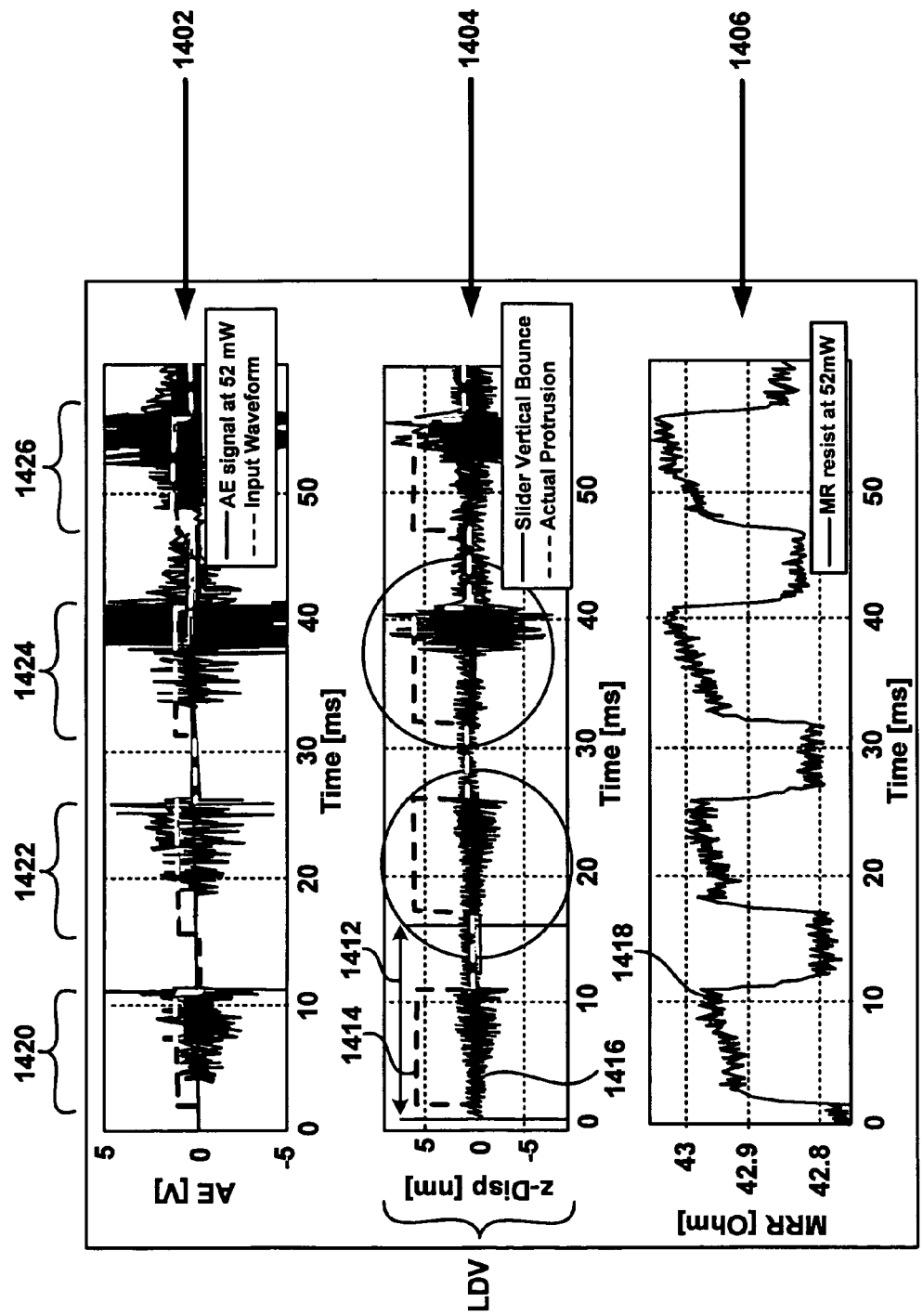
FIG. 14 is a diagram of multiple graphs that represent actual measurements in accordance with various embodiments of the invention.

Specifically, FIG. 14 is a diagram that includes graphs 1402, 1404 and 1406 that represent actual measurements corresponding to when a slider (e.g., 155) went in and out of contact four consecutive times with the same area of a disk (e.g., 138) using a similar amount of slider thermal protrusion. Therefore, by utilizing one or more measurement methods, it can be determined how long it approximately takes for slider instability to develop while the slider is in contact (or grazing contact or quasi-contact) with the disk.

Within FIG. 14, graph 1402 includes a signal 1410 that measures the change in the amplitude of acoustic emission (AE) voltage (V) in the Y-axis versus time (ms) in the X-axis. Graph 1402 also includes an input waveform signal 1408 (as shown by a dashed line) that represents the voltage waveform that was input to a thermal heater of the slider. Graph 1404 includes a slider vertical bounce signal 1416 that measures the change in vertical displacement amplitude of Laser Doppler velocimetry (LDV) in nanometers (nm) in the Y-axis versus time (ms) in the X-axis. Graph 1404 also includes an actual slider protrusion signal 1414 (as shown by a dashed line). Graph 1406 includes a signal 1418 that measures the change in amplitude of MR resistance in ohms in the Y-axis versus time (ms) in the X-axis.

Within graph 1404, note that during the first contact 1420 the slider vertical bounce signal 1416 exhibits substantially no LDV instability or bounce for approximately 9 ms. However, during the second contact 1422 the slider vertical bounce signal 1416 exhibits some increase of instability or bounce at the end of the applied input write pulse 1408. Conversely, within graph 1402, the AE signal 1410 shows an instability signal prior to the LDV bounce signal 1416 of graph 1404. It is pointed out that the AE signal 1410 is more sensitive to contact than the LDV bounce signal 1416. As such, by utilizing the first contact 1420, the second contact 1422, and the third contact 1424 of the AE signal 1410 of graph 1402, it can be seen that actual instability seems to develop after a few milliseconds of the slider being in contact with the disk. Therefore, the few milliseconds time frame can be utilized as the determined time frame of operation 1306 wherein the slider can be in contact with the disk without experiencing any instability, or any substantial instability, or any bouncing or any substantial bouncing. It is noted that within FIG. 14, the thermal expansion of the slider is already convolved by the head transfer-function which can cause a delay of approximately 0.7 to 1 ms until the slider is fully protruded. It is pointed out that the MR resistance signal 1418 of graph 1406 does not appear to be as helpful in determining the time frame wherein the slider can be in contact with the disk without experiencing any instability or any substantial instability. Additionally, during the fourth slider contact 1426, the AE signal 1410 of graph 1402 does not appear to be as helpful in determining the time frame wherein the slider can be in contact with the disk without experiencing any instability or any substantial instability.

Given what is shown in FIG. 14, one embodiment for determining the time frame wherein a slider can be in contact with a disk without experiencing any instability, or any substantial instability, or any bouncing or any substantial bouncing can include causing the slider to come in and out of contact (or grazing contact or quasi-contact) one or more times with a similar area of the disk using a similar amount of active fly height control for the slider. Also, one or more contact measurement or determination methods (as described herein) can be utilized to determine how long it approximately takes for slider instability to develop while the slider is in contact (or grazing contact or quasi-contact) with the disk.

Within FIG. 14, it is understood that the first slider contact 1420 occurred within one revolution of the disk, as indicated by the double headed arrow 1412. Additionally, the second slider contact 1422, the third slider contact 1424, and the fourth slider contact 1426 each occurred within a separate revolution of the disk. More specifically, each of slider contacts 1420, 1422, 1424, and 1426 occurred in four consecutive disk revolutions. However, the invention is not limited to such. For example, in various embodiments in accordance with the invention, multiple slider contacts (or grazing contacts or quasi-contacts) with the disk to determine the slider instability time frame can occur utilizing any type of regular or irregular frequency.

At operation 1308 of FIG. 13, the determined time frame can be stored. It is understood that the determined time frame at operation 1308 is the approximate amount of time the slider can be in contact (or grazing contacts or quasi-contacts) with the disk without experiencing any instability or any substantial instability. It is noted that operation 1308 can be implemented in a wide variety of ways. For example, the determined time frame can be stored at operation 1308 using, but is not limited to, memory, one or more memory devices, computing device usable volatile memory, computing device usable non-volatile memory, one or more computing devices, or any combination thereof. At the completion of operation 1308, process 1300 can be exited.

Figure 15:
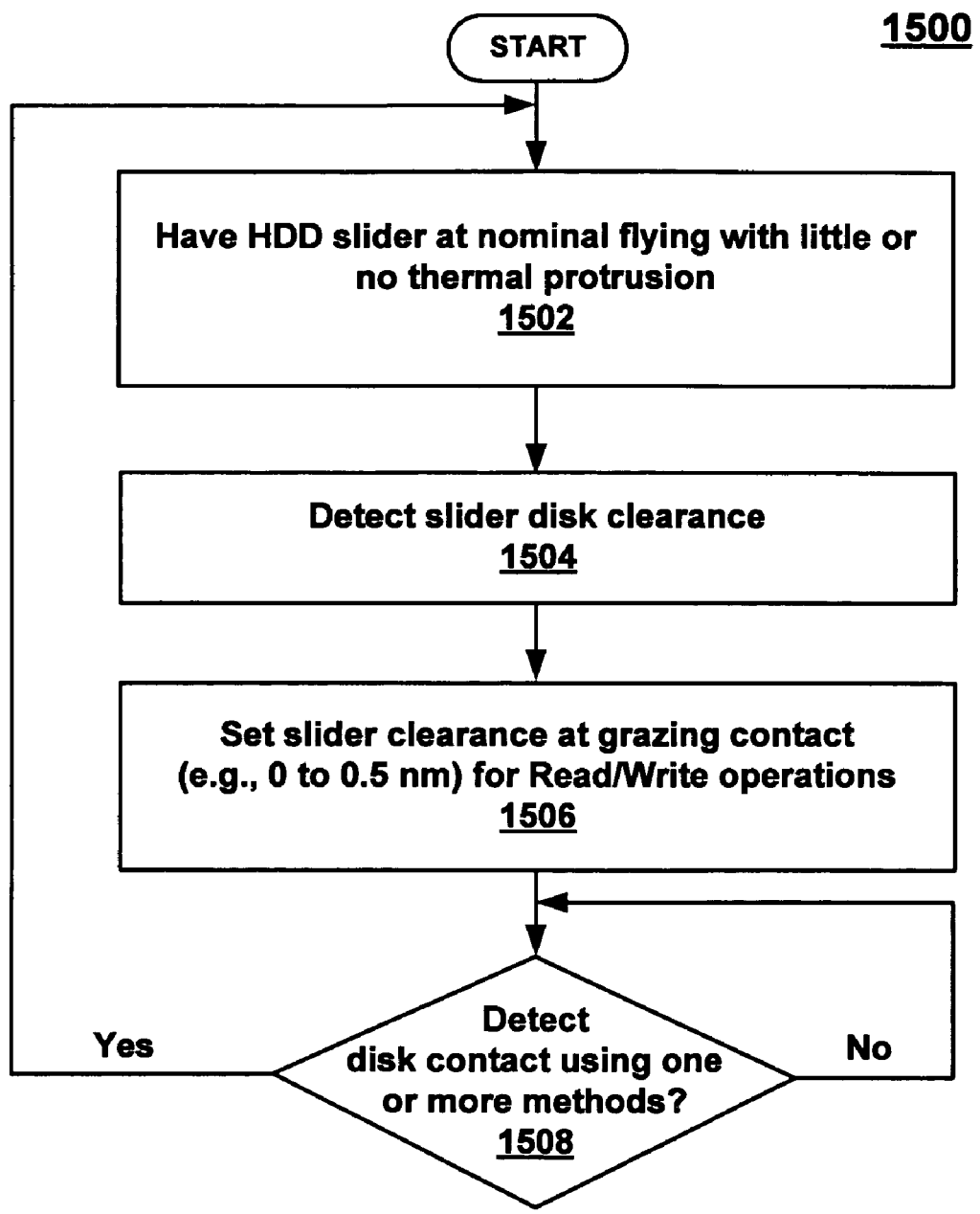
FIG. 15 is yet another flow diagram in accordance with various embodiments of the invention.

FIG. 15 is a flow diagram of an exemplary method 1500 in accordance with various embodiments of the invention for detecting a HDD slider clearance which can enable performing HDD contact recording on-demand. Method 1500 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 1500, such operations are exemplary. Method 1500 may not include all of the operations illustrated by FIG. 15. Also, method 1500 may include various other operations and/or variations of the operations shown by FIG. 15. Likewise, the sequence of the operations of method 1500 can be modified. It is noted that the operations of method 1500 can be performed manually, by software, by firmware, by electronic hardware, or by any combination thereof.

Specifically, method 1500 can include having a HDD slider at nominal flying with little to no thermal protrusion. A slider disk clearance can be detected or determined. Based on the determined slider clearance, the slider clearance can be set at grazing contact (e.g., 0 to 0.5 nm) for Read/Write operations. A determination can be made as to whether disk contact has been detected using one or more methods. If not, method 1500 can repeat the determination. However, if disk contact is detected, method 1500 can proceed to returning the HDD slider to its nominal flying without thermal protrusion. In this manner, the slider clearance can be determined which can enable HDD contact (or quasi-contact) recording on-demand.

At operation 1502 of FIG. 15, a HDD slider can be held at nominal flying with little to no thermal protrusion. It is appreciated that operation 1502 can be implemented in a wide variety of ways. For example in various embodiments, the HDD slider can be held at nominal flying with little to no thermal protrusion at operation 1502 in any manner similar to that described herein, but is not limited to such.

At operation 1504, a slider disk clearance can be detected or determined. It is understood that detecting or determining the slider disk clearance at operation 1504 can be implemented in a wide variety of ways. For example in various embodiments, the slider disk clearance can be detected or determined using a single non-binary pulse (e.g., voltage and/or power) in order to bring the slider into and out of contact with the disk at operation 1504 in any manner similar to that described herein, but is not limited to such. In various embodiments, the slider disk clearance can be detected or determined using one or more binary pulses (e.g., voltage and/or power) to bring the slider into and out of contact with the disk at operation 1504.

At operation 1506 of FIG. 15, based on the determined slider clearance, the slider clearance can be set at grazing contact or quasi-contact (e.g., 0 to 0.5 nm) for Read/Write operations. It is noted that operation 1506 can be implemented in a wide variety of ways. For example in various embodiments, operation 1506 can be implemented in any manner similar to that described herein, but is not limited to such.

At operation 1508, a determination can be made as to whether disk contact has been detected using one or more methods. If disk contact is not detected at operation 1508, process 1500 can proceed to repeat the determination at operation 1508. However, if disk contact is detected at operation 1508, process 1500 can proceed to operation 1502. It is appreciated that operation 1508 can be implemented in a wide variety of ways. For example in various embodiments, detecting disk contact using one or more methods at operation 1508 can be implemented in any manner similar to that described herein, but is not limited to such. In this manner, the slider clearance can be determined which can enable HDD contact (or quasi-contact) recording on-demand.

Figure 16:
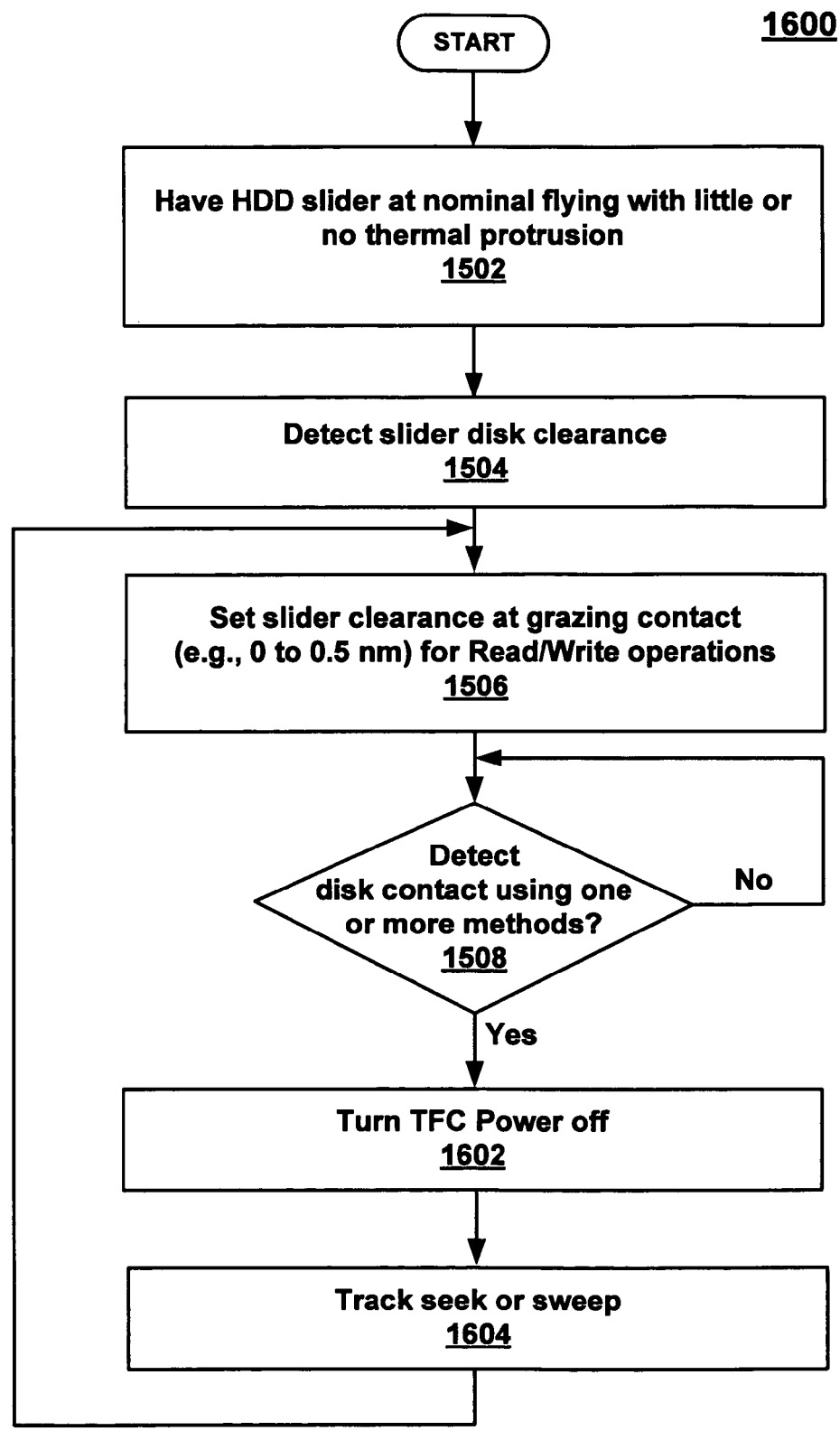
FIG. 16 is another flow diagram in accordance with various embodiments of the invention.

FIG. 16 is a flow diagram of an exemplary method 1600 in accordance with various embodiments of the invention for detecting a HDD slider clearance which can enable performing HDD contact recording on-demand. Method 1600 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 1600, such operations are exemplary. Method 1600 may not include all of the operations illustrated by FIG. 16. Also, method 1600 may include various other operations and/or variations of the operations shown by FIG. 16. Likewise, the sequence of the operations of method 1600 can be modified. It is noted that the operations of method 1600 can be performed manually, by software, by firmware, by electronic hardware, or by any combination thereof.

Specifically, method 1600 can include having a HDD slider at nominal flying with little to no thermal protrusion. A slider disk clearance can be detected or determined. Based on the determined slider clearance, the slider clearance can be set at grazing contact (e.g., 0 to 0.5 nm) for Read/Write operations. A determination can be made as to whether disk contact has been detected using one or more methods. If not, method 1600 can repeat the determination. However, if disk contact is detected, method 1600 can proceed to turning off the power to the Thermal Fly-height Control (TFC) of the slider. Then the seek or sweep can be tracked. After which, method 1600 can return to set the slider clearance at grazing contact for Read/Write operations, based on the determined slider clearance. In this manner, the slider clearance can be determined which can enable HDD contact (or quasi-contact) recording on-demand.

It is noted that operations 1502, 1504, 1506 and 1508 of FIG. 16 are similar to operations 1502, 1504, 1506 and 1508 of FIG. 15. However, if disk contact is detected at operation 1508 of FIG. 16, process 1600 can proceed to operation 1602.

At operation 1602 of FIG. 16, the power to the Thermal Fly-height Control of the slider can be turned off. It is appreciated that operation 1602 can be implemented in a wide variety of ways. For example in various embodiments, the power to the Thermal Fly-height Control of the slider can be turned off at operation 1502 in any manner similar to that described herein, but is not limited to such.

At operation 1604, the seek or sweep can be tracked. It is appreciated that operation 1604 can be implemented in a wide variety of ways. For example in various embodiments, the seek or sweep can be tracked at operation 1604 in any manner similar to that described herein, but is not limited to such. At the completion of operation 1604, process 1600 can proceed to operation 1506. In this manner, the slider clearance can be determined which can enable HDD contact (or quasi-contact) recording on-demand.

Figure 17:
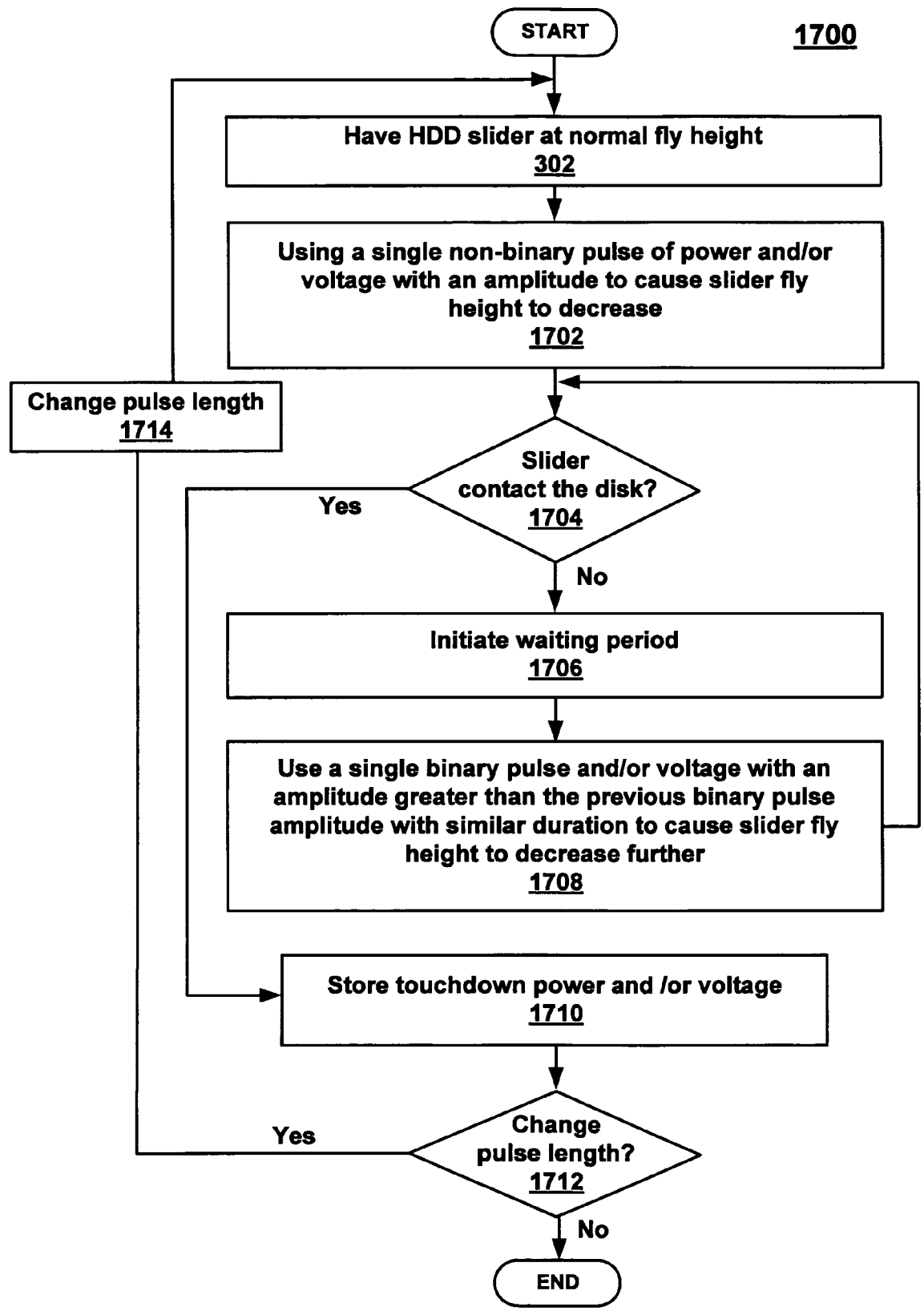
FIG. 17 is still another flow diagram in accordance with various embodiments of the invention.

FIG. 17 is a flow diagram of an exemplary method 1700 in accordance with various embodiments of the invention for calibrating a HDD slider clearance between the slider and a disk. Method 1700 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 1700, such operations are exemplary. Method 1700 may not include all of the operations illustrated by FIG. 17. Also, method 1700 may include various other operations and/or variations of the operations shown by FIG. 17. Likewise, the sequence of the operations of method 1700 can be modified. It is noted that the operations of method 1700 can be performed manually, by software, by firmware, by electronic hardware, or by any combination thereof.

Specifically, method 1700 can include having a HDD slider located at its normal fly height. A single binary (or square wave) pulse of power and/or voltage can be used to cause a slider fly height to decrease. During the single binary pulse, a continuous determination can be made as to whether the slider is in contact with the disk. If so, the touchdown power and/or voltage can be stored. However, if there is no contact and the single binary pulse ends, a waiting period can be initiated. After the waiting period, a single binary pulse of power and/or voltage with amplitude greater than the previous binary pulse amplitude having a similar duration can be used to cause the slider fly height to decrease further. The continuous determination can then be repeated during the single binary pulse. Therefore, method 1700 enables increasingly larger amplitudes of single binary pulses to be utilized, after the waiting period, to eventually cause the slider to contact a disk of the HDD. In this manner, a HDD slider clearance between the slider and the disk can be calibrated.

Note that operation 302 of FIG. 17 is similar to operation 302 of FIG. 3. Within FIG. 17, operation 1702 can follow operation 302.

At operation 1702 of FIG. 17, a single binary (or square wave) pulse of power and/or voltage having an amplitude can be used to cause a slider fly height to decrease. It is understood that operation 1702 can be implemented in a wide variety of ways. For example in one embodiment, the single binary pulse of power and/or voltage can be input into an active fly-height control capability of a slider (e.g., 155) at operation 1702, which can cause the fly height (e.g., 202) of the slider to decrease between it and a disk (e.g., 138) of the HDD. In various embodiments, the single binary pulse can have a short duration (e.g., approximately one revolution of the disk, but is not limited to such) and a known amplitude of power and/or voltage. Operation 1702 can be implemented in any manner similar to that described herein, but is not limited to such.

At operation 1704, during the single binary pulse, a continuous determination can be made as to whether the slider is in contact with the disk. If so, method 1700 can proceed to operation 1710. However, if it is determined that the slider has not contacted the disk and the single binary pulse ends, method 1700 can proceed to operation 1706. It is noted that operation 1704 can be implemented in a wide variety of ways. For example, determining whether the slider is in contact with the disk at operation 1704 can be implemented in any manner similar to that described herein, but is not limited to such. It is pointed out that once the single binary pulse ends, this can cause the slider fly-height to increase. In this manner, contact between the slider and the disk can be limited.

At operation 1706 of FIG. 17, a waiting period can be initiated before decreasing the slider fly-height again. It is pointed out that operation 1706 can be implemented in a wide variety of ways. For example in various embodiments in accordance with the invention, the waiting period can be for approximately one revolution of the disk, but is not limited to such. Operation 1706 can be implemented in any manner similar to that described herein, but is not limited to such.

At operation 1708, a single binary pulse (or square wave) of power and/or voltage with an amplitude greater than the previously applied binary pulse amplitude arid having a similar duration can be used to cause the slider fly height to decrease further. It is understood that operation 1708 can be implemented in a wide variety of ways. For example in one embodiment, the single binary pulse of power and/or voltage at operation 1708 can be input into the active fly-height control capability of the slider. In various embodiments, the single binary pulse can have a short duration (e.g., approximately one revolution of the disk, but is not limited to such) and a known amplitude of power and/or voltage that is greater than the previously applied binary pulse amplitude. Operation 1708 can be implemented in any manner similar to that described herein, but is not limited to such. Note that during the single binary pulse at operation 1708, the continuous determination can be made at operation 1704 as to whether the slider is in contact with the disk.

At operation 1710 of FIG. 17, the value (or amplitude) of the power and/or voltage utilized to cause the slider to contact the disk (touchdown) can be stored. It is pointed out that the touchdown power and/or voltage can be the amount or amplitude of power and/or voltage of the single binary pulse utilized with the active fly-height control capability that caused the slider to make contact with the disk. Operation 1710 can be implemented in a wide variety of ways. For example, the touchdown power and/or voltage can be stored at operation 1710 in any manner similar to that described herein, but is not limited to such.

At operation 1712, a determination can be made as to whether to change the length or duration of the single binary pulses utilized during operations 1702 and 1708. If so, method 1700 can proceed to operation 302. If not, method 1700 can be exited. Note that operation 1712 can be implemented in a wide variety of ways. For example in one embodiment, if it is determined at operation 1712 that the most recently stored touchdown voltage and/or power at operation 1710 is greater than a previously stored touchdown voltage and/or power, it can be determined at operation 1712 to change the length of the single binary pulses utilized during operations 1702 and 1708. However in one embodiment, if it is determined at operation 1712 that the most recently stored touchdown voltage and/or power at operation 1710 is less than a previously stored touchdown voltage and/or power, it can be determined at operation 1712 to not change the length of the single binary pulses.

At operation 1714 of FIG. 17, the length or duration can be changed of the single binary pulses utilized during operations 1702 and 1708. It is pointed out that operation 1714 can be implemented in a wide variety of ways. For example in one embodiment, the length of the single binary pulses utilized during operations 1702 and 1708 can be increased or extended. Note that in one embodiment the length of the single binary pulses of operations 1702 and 1708 can be substantially similar, but are not limited to such. It is pointed out that by increasing the length of the single binary pulses of operations 1702 and 1708, it may be determined that the voltage and/or power for contact is lower than when shorter duration single binary pulses were utilized at operations 1702 and 1708. In one embodiment, the length of the single binary pulses of operations 1702 and 1708 can be two or three or more revolutions of the disk, but is not limited to such. In one embodiment, the length of the single binary pulses of operations 1702 and 1708 can be 10 revolutions of the disk or less, but is not limited to such. In an embodiment, the length of the single binary pulses of operations 1702 and 1708 can be approximately 15 ms or less, but is not limited to such.

Figure 18:
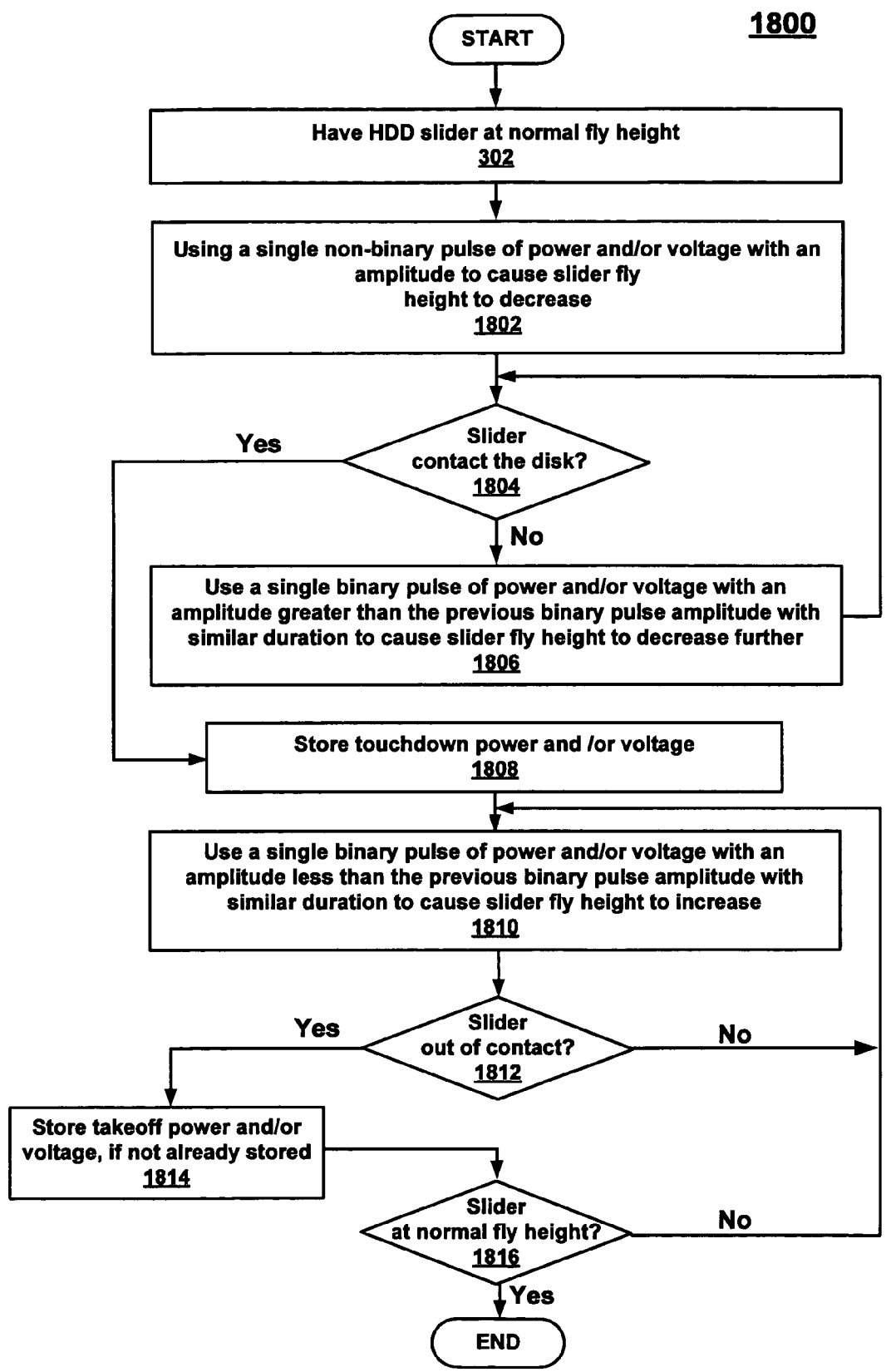
FIG. 18 is yet another flow diagram in accordance with various embodiments of the invention.

FIG. 18 is a flow diagram of an exemplary method 1800 in accordance with various embodiments of the invention for calibrating a HDD slider clearance between the slider and a disk. Method 1800 includes exemplary processes of various embodiments of the invention that can be carried out by a processor(s) and electrical components under the control of computing device readable and executable instructions (or code), e.g., software. The computing device readable and executable instructions (or code) may reside, for example, in data storage features such as volatile memory, non-volatile memory, and/or mass data storage that can be usable by a computing device. However, the computing device readable and executable instructions (or code) may reside in any type of computing device readable medium. Although specific operations are disclosed in method 1800, such operations are exemplary. Method 1800 may not include all of the operations illustrated by FIG. 18. Also, method 1800 may include various other operations and/or variations of the operations shown by FIG. 18. Likewise, the sequence of the operations of method 1800 can be modified. It is noted that the operations of method 1800 can be performed manually, by software, by firmware, by electronic hardware, or by any combination thereof.

Specifically, method 1800 can include having a HDD slider located at its normal fly height. A single binary (or square wave) pulse of power and/or voltage can be used to cause a slider fly height to decrease. During the single binary pulse, a continuous determination can be made as to whether the slider is in contact with the disk. If so, the touchdown power and/or voltage can be stored. However, if there is no contact and the single binary pulse ends, another single binary pulse of power and/or voltage with amplitude greater than the previous binary pulse amplitude having a similar duration can be used to cause the slider fly height to continue to decrease further. The continuous determination can then be repeated during the current single binary pulse. Once the touchdown power and/or voltage has been stored, a single binary pulse of power and/or voltage can be used with an amplitude less than the previous binary pulse amplitude with similar duration to cause the slider fly height to increase. A determination can be made as to whether the slider has gone out of contact with the disk (take-off). If so, the takeoff power and/or voltage can be stored, if not already stored. However, if the slider is still in contact with the disk and the single binary pulse ends, another single binary pulse of power and/or voltage with amplitude less than the previous binary pulse amplitude having a similar duration can be used to cause the slider fly height to continue to increase further. After the takeoff power and/or voltage is stored, a determination can be made as to whether the slider has reached its normal fly height. If not, another single binary pulse of power and/or voltage with amplitude less than the previous binary pulse amplitude having a similar duration can be used to cause the slider fly height to continue to increase further. In this manner, a HDD slider clearance between the slider and the disk can be calibrated.

Note that operation 302 of FIG. 18 is similar to operation 302 of FIG. 3. Within FIG. 18, operation 1802 can follow operation 302.

At operation 1802 of FIG. 18, a single binary (or square wave) pulse of power and/or voltage having an amplitude can be used to cause a slider fly height to decrease. It is understood that operation 1802 can be implemented in a wide variety of ways. For example in one embodiment, the single binary pulse of power and/or voltage can be input into an active fly-height control capability of a slider (e.g., 155) at operation 1802, which can cause the fly height (e.g., 202) of the slider to decrease between it and a disk (e.g., 138) of the HDD. In various embodiments, the single binary pulse can have a short duration (e.g., approximately one revolution of the disk, but is not limited to such) and a known amplitude of power and/or voltage. Operation 1802 can be implemented in any manner similar to that described herein, but is not limited to such.

At operation 1804, during the single binary pulse, a continuous determination can be made as to whether the slider is in contact with the disk. If so, method 1800 can proceed to operation 1808. However, if it is determined that the slider has not contacted the disk and the single binary pulse ends, method 1800 can proceed to operation 1806. It is noted that operation 1804 can be implemented in a wide variety of ways. For example, determining whether the slider is in contact with the disk at operation 1804 can be implemented in any manner similar to that described herein, but is not limited to such.

At operation 1806 of FIG. 18, a single binary pulse (or square wave) of power and/or voltage with an amplitude greater than the previously applied binary pulse amplitude and having a similar duration can be used to cause the slider fly height to continue to decrease further. It is understood that operation 1806 can be implemented in a wide variety of ways. For example in one embodiment, the single binary pulse of power and/or voltage at operation 1806 can be input into the active fly-height control capability of the slider. In various embodiments, the single binary pulse can have a short duration (e.g., approximately one revolution of the disk, but is not limited to such) and a known amplitude of power and/or voltage that is greater than the previously applied binary pulse amplitude. Operation 1806 can be implemented in any manner similar to that described herein, but is not limited to such. Note that during the single binary pulse at operation 1806, the continuous determination can be made at operation 1804 as to whether the slider is in contact with the disk.

At operation 1808 of FIG. 18, the value (or amplitude) of the power and/or voltage utilized to cause the slider to contact the disk (touchdown) can be stored. It is pointed out that the touchdown power and/or voltage can be the amount or amplitude of power and/or voltage of the single binary pulse utilized with the active fly-height control capability that finally caused the slider to make contact with the disk. Operation 1808 can be implemented in a wide variety of ways. For example, the touchdown power and/or voltage can be stored at operation 1808 in any manner similar to that described herein, but is not limited to such.

At operation 1810, a single binary pulse of power and/or voltage can be used with amplitude less than the previous binary pulse amplitude with similar duration to cause the slider fly height to increase. It is noted that operation 1810 can be implemented in a wide variety of ways. For example in one embodiment, the single binary pulse of power and/or voltage at operation 1810 can be input into the active fly-height control capability of the slider. In various embodiments, the single binary pulse can have a short duration (e.g., approximately one revolution of the disk, but is not limited to such) and a known amplitude of power and/or voltage that is less than the previously applied binary pulse amplitude. Operation 1810 can be implemented in any manner similar to that described herein, but is not limited to such.

At operation 1812 of FIG. 18, a determination can be made as to whether the slider has gone out of contact with the disk (take-off) during the single binary pulse at operation 1810. If so, process 1800 can proceed to operation 1814. However, if it is determined at operation 1812 that the slider is still in contact with the disk, the process 1800 can proceed to operation 1810, wherein another single binary pulse of power and/or voltage with amplitude less than the previous binary pulse amplitude having a similar duration can be used to cause the slider fly height to continue to increase further. In this manner, the slider can gradually come out of contact with the disk, in accordance with an embodiment of the invention. It is noted that operation 1812 can be implemented in a wide variety of ways. For example, operation 1812 can be implemented in any manner similar to that described herein, but is not limited to such.

At operation 1814, the value (or amplitude) of the power and/or voltage utilized to cause the slider to go out of contact with the disk (takeoff) can be stored, if it has not already been stored. It is pointed out that the takeoff power and/or voltage can be the amount or amplitude of power and/or voltage of the single binary pulse utilized with the active fly-height control capability that caused the slider to go out of contact with the disk. Operation 1814 can be implemented in a wide variety of ways. For example, the takeoff power and/or voltage can be stored at operation 1814 in any manner similar to that described herein, but is not limited to such. It is pointed out that by storing the touchdown power and/or voltage at operation 1808 and storing the takeoff power and/or voltage at operation 1814, the hysteresis can be determined between the touchdown of the slider onto the disk and the takeoff of the slider out of contact of the disk. Note that the hysteresis can then be utilized in any manner similar to that described herein.

At operation 1816 of FIG. 18, a determination can be made as to whether the slider has reached its normal fly height. If not, process 1800 can proceed to operation 1810. However, if it is determined at operation 1816 that the slider has reached its normal fly height, the process 1800 can be exited. Operation 1816 can be implemented in a wide variety of ways. For example in one embodiment, it can be determined at operation 1816 that the slider has reached its normal fly height when the it returns to the fly height that it began with at operation 302. Operation 1816 can be implemented in any manner similar to that described herein, but is not limited to such. In this manner, a HDD slider clearance between the slider and the disk can be calibrated.

It is pointed out that method 1800 can be implemented to include operations 1712 and 1714. For example, operations 1712 and 1714 can be positioned after operation 1816, but are not limited to such. Operation 302 of FIG. 18 could then follow after operation 1714, but is not limited to such.

Note that each of methods 1700 and 1800 can be utilized to determine or calibrating in-drive a HDD slider clearance between the slider and a disk. Furthermore, each of methods 1700 and 1800 can be utilized in combination with one or more embodiments in accordance with the invention, but is not limited to such.

It is noted that any non-binary pulse mentioned herein may also be referred to as, but is not limited to, a non-binary waveform pulse, a non-binary pulse waveform, a non-binary waveform, a non-binary wave pulse, a non-square wave pulse, a non-square wave pulse waveform, a non-square pulse waveform, a non-square waveform pulse, and the like.

The foregoing descriptions of various specific embodiments in accordance with the invention have been presented for purposes of illustration and description. They are not intended to be exhaustive or to limit the invention to the precise forms disclosed, and obviously many modifications and variations are possible in light of the above teaching. The invention can be construed according to the Claims and their equivalents.

What is claimed is:

1. A method comprising:
   determining if a slider of a data storage device is to perform a read or write operation with a disk of said data storage device;
   if said slider is to perform said read or write operation, setting said slider at a grazing contact with said disk for a predefined time frame to perform said read or write operation, said predefined time frame is approximately how long said slider can be in grazing contact with said disk without experiencing any substantial instability;
   after said predefined time frame expires, causing said slider to move out of grazing contact with said disk.

2. The method of claim 1, further comprising:
   determining if said slider has instability while at said grazing contact.

3. The method of claim 2, wherein said determining if said slider has instability comprises monitoring a motor current of said data storage device.

4. The method of claim 2, wherein said determining if said slider has instability comprises monitoring an amplitude of a read back signal associated with said slider.

5. The method of claim 1, further comprising:
   determining if said read or write operation has been completed by said slider; and
   if said read or write operation has been completed, causing said slider to move out of grazing contact with said disk.

6. The method of claim 1, further comprising:
   performing said read or write operation within one revolution of said disk.

7. The method of claim 1, wherein said setting comprises using a known power for setting said slider at said grazing contact with said disk, wherein said known power can be determined by inputting a single non-binary power waveform into an active fly-height control device of said slider.

8. The method of claim 7, wherein said active fly-height control device comprises a thermal heater.

9. A method comprising:
   using a single non-binary pulse of power to cause a slider of a data storage device to descend into contact with a disk of said data storage device;
   determining if said slider is in contact with the disk; and
   causing said slider to move out of contact with said disk as part of said single non-binary pulse of power.

10. The method of claim 9, wherein said determining if said slider is in contact with the disk comprises monitoring an amplitude of a read back signal associated with said slider.

11. The method of claim 9, wherein said determining if said slider is in contact with the disk comprises monitoring an amplitude of a MR resistance signal associated with said slider.

12. The method of claim 9, wherein said determining if said slider is in contact with the disk comprises monitoring an amplitude of a position error signal (PES) associated with said slider.

13. The method of claim 9, wherein said determining if said slider is in contact with the disk comprises monitoring an amplitude of a tribo current signal associated with said slider.

14. The method of claim 9, wherein said determining if said slider is in contact with the disk comprises monitoring a motor current of said data storage device.

15. The method of claim 9, wherein said determining if said slider is in contact with the disk comprises monitoring an acoustic emission (AB) signal of said data storage device.

16. The method of claim 9, further comprising:
   storing a value of the amount of power utilized to descend said slider into contact with said disk.

17. A method comprising:
   using a first plurality of binary pulses of voltage to cause a slider of a data storage device to descend into contact with a disk of said data storage device;
   determining if said slider is in contact with the disk during each binary pulse of said first plurality of binary pulses; and
   using a second plurality of binary pulses of voltage to cause said slider to move out of contact with said disk.

18. The method of claim 17, further comprising:
   determining if said slider is out of contact with the disk during each binary pulse of said second plurality of binary pulses.

19. The method of claim 17, further comprising:
   storing a first value of the amount of voltage utilized to descend said slider into contact with said disk.

20. The method of claim 17, further comprising:
   storing a second value of the amount of voltage utilized to move said slider out of contact with said disk.

* * * * *